United States Patent
Ota et al.

(10) Patent No.: US 11,158,041 B2
(45) Date of Patent: Oct. 26, 2021

(54) INSPECTION DEVICE AND CASTING SYSTEM

(71) Applicant: SINTOKOGIO, LTD., Nagoya (JP)

(72) Inventors: Kazuhiro Ota, Toyokawa (JP);
Tsutomu Seki, Toyokawa (JP);
Yoshimitsu Ichino, Toyokawa (JP);
Junichi Iwasaki, Toyokawa (JP);
Takeshi Sonohara, Toyokawa (JP);
Ryuichi Kawakami, Atsugi (JP);
Tatsuya Aoki, Atsugi (JP)

(73) Assignee: SINTOKOGIO, LTD., Nagoya (JP)

( * ) Notice: Subject to any disclaimer, the term of this patent is extended or adjusted under 35 U.S.C. 154(b) by 134 days.

(21) Appl. No.: 16/486,907

(22) PCT Filed: May 10, 2018

(86) PCT No.: PCT/JP2018/018190
§ 371 (c)(1),
(2) Date: Aug. 19, 2019

(87) PCT Pub. No.: WO2018/216495
PCT Pub. Date: Nov. 29, 2018

(65) Prior Publication Data
US 2020/0234419 A1     Jul. 23, 2020

(30) Foreign Application Priority Data

May 26, 2017   (JP) .............................. JP2017-104685

(51) Int. Cl.
*G06K 9/00*       (2006.01)
*G06T 7/00*       (2017.01)
(Continued)

(52) U.S. Cl.
CPC .............. *G06T 7/001* (2013.01); *B22C 19/04* (2013.01); *B22D 37/00* (2013.01); *G01N 21/90* (2013.01);
(Continued)

(58) Field of Classification Search
CPC ....... G06T 7/001; G06T 7/004; G06T 7/0044; G06T 2207/30108; G06T 2207/30141;
(Continued)

(56) References Cited

U.S. PATENT DOCUMENTS 4,817,184 A * 3/1989 Thomason ......... C12N 15/1003
                                                            382/141
5,586,058 A * 12/1996 Aloni ............... G01N 21/95607
                                                            382/141
(Continued)

FOREIGN PATENT DOCUMENTS

JP    H02-165842 A    6/1990
JP    H04-329344 A    11/1992
(Continued)

OTHER PUBLICATIONS

International Preliminary Report on Patentability (IPRP) dated Dec. 5, 2019 that issued in WO Patent Application No. PCT/JP2018/018190.

*Primary Examiner* — Amir Alavi
(74) *Attorney, Agent, or Firm* — Faegre Drinker Biddle & Reath LLP

(57) ABSTRACT

An inspection device is a device that inspects the appearance of a target, including: an imaging device configured to image the target from a first direction; an illuminating unit configured to apply light to the target; and a controller configured to acquire a first inspection image by causing the imaging device to image the target to which light is applied from a first position, to acquire a second inspection image by
(Continued)

causing the imaging device to image the target to which light is applied from a second position, and to inspect an appearance of the target based on the first inspection image, the second inspection image, and a reference image. The first position and the second position overlap each other when viewed from the first direction.

20 Claims, 16 Drawing Sheets

(51) Int. Cl.
  *B22C 19/04* (2006.01)
  *B22D 37/00* (2006.01)
  *G01N 21/90* (2006.01)
  *G06K 9/20* (2006.01)
  *G01N 21/88* (2006.01)

(52) U.S. Cl.
  CPC ......... *G06K 9/2027* (2013.01); *G06K 9/2036* (2013.01); *G01N 2021/8809* (2013.01); *G06T 2207/30108* (2013.01)

(58) Field of Classification Search
  CPC ........ G06T 2207/30148; G06K 9/2027; G06K 9/2036; B22C 19/04; G01N 21/90; G01N 2021/8809
  See application file for complete search history.

(56) References Cited

U.S. PATENT DOCUMENTS

| | | | | |
|---|---|---|---|---|
| 5,625,193 A * | 4/1997 | Broude | ............. | G01N 21/9501 250/360.1 |
| 6,031,607 A * | 2/2000 | Miyazaki | ................ | G06T 7/001 356/237.1 |
| 6,400,838 B2 * | 6/2002 | Watanabe | ............. | G06T 7/0006 382/144 |
| 6,965,120 B1 | 11/2005 | Beyerer et al. | | |
| 7,453,577 B2 * | 11/2008 | Van Der Wert | ...... | G01N 21/211 356/495 |
| 7,512,259 B2 * | 3/2009 | Maeda | ............. | G01N 21/95607 382/144 |
| 8,976,367 B2 * | 3/2015 | Bellis | ................. | G01B 11/2513 356/603 |
| 9,575,010 B2 * | 2/2017 | Ogawa | ........................ | G03F 1/84 |
| 9,797,846 B2 * | 10/2017 | Tsuchiya | ............. | G01N 21/9501 |
| 10,460,435 B2 * | 10/2019 | Inoue | ...................... | G06T 7/001 |
| 2014/0372075 A1 * | 12/2014 | Kojima | ................. | G01N 21/55 702/167 |
| 2015/0355102 A1 | 12/2015 | Kido | | |
| 2020/0234419 A1 * | 7/2020 | Ota | .................... | G01N 21/9515 |

FOREIGN PATENT DOCUMENTS

| | | |
|---|---|---|
| JP | H08-39194 A | 2/1996 |
| JP | H10-103938 A | 4/1998 |
| JP | 2588909 Y2 | 1/1999 |
| JP | 2003-117635 A | 4/2003 |
| JP | 2004-109094 A | 4/2004 |
| JP | 2005-164488 A | 6/2005 |
| JP | 2007-212544 A | 8/2007 |
| JP | 2007-292641 A | 11/2007 |
| JP | 2015-68668 A | 4/2015 |
| JP | 2015-121521 A | 7/2015 |
| JP | 2016-50864 A | 4/2016 |
| WO | WO 2016/035381 A1 | 3/2016 |

* cited by examiner

Fig.2

| MOLD ID | PATTERN CODE | INSPECTION RESULT | POSITION |
|---|---|---|---|
| 1001 | A | OK | |
| 1002 | B | OK | P19 |
| 1003 | A | OK | P18 (POURING AREA) |
| 1004 | B | NG | P17 |
| 1005 | A | OK | P16 |
| 1006 | B | OK | P15 |
| 1007 | A | Fail | P14 |
| 1008 | B | OK | P13 |
| 1009 | A | OK | P12 |
| 1010 | B | OK | P11 |
| 1011 | A | OK | P10 |
| 1012 | B | NG | P9 (CORE SETTING AREA) |
| 1013 | A | OK | P8 |
| 1014 | B | OK | P7 |
| 1015 | A | OK | P6 |
| 1016 | B | | P5 (INSPECTION AREA) |
| 1017 | A | | P4 |
| 1018 | B | | P3 |
| 1019 | A | | P2 |
| 1020 | B | | P1 (MOLDING AREA) |

Fig.4
(a)
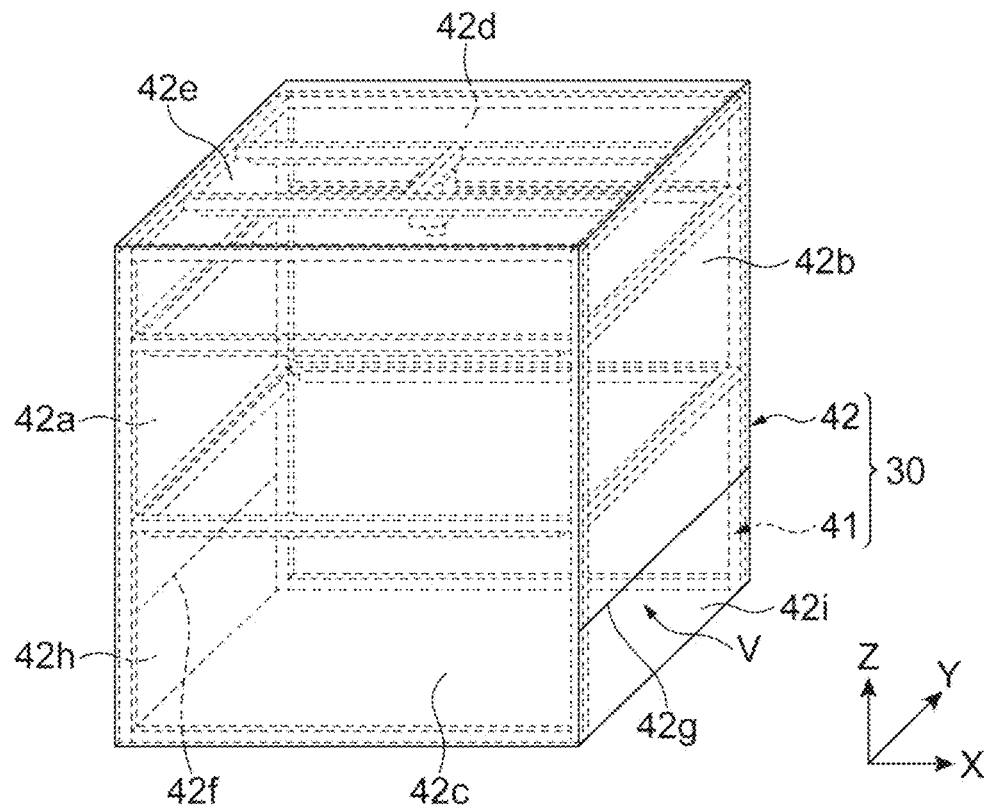
(b)
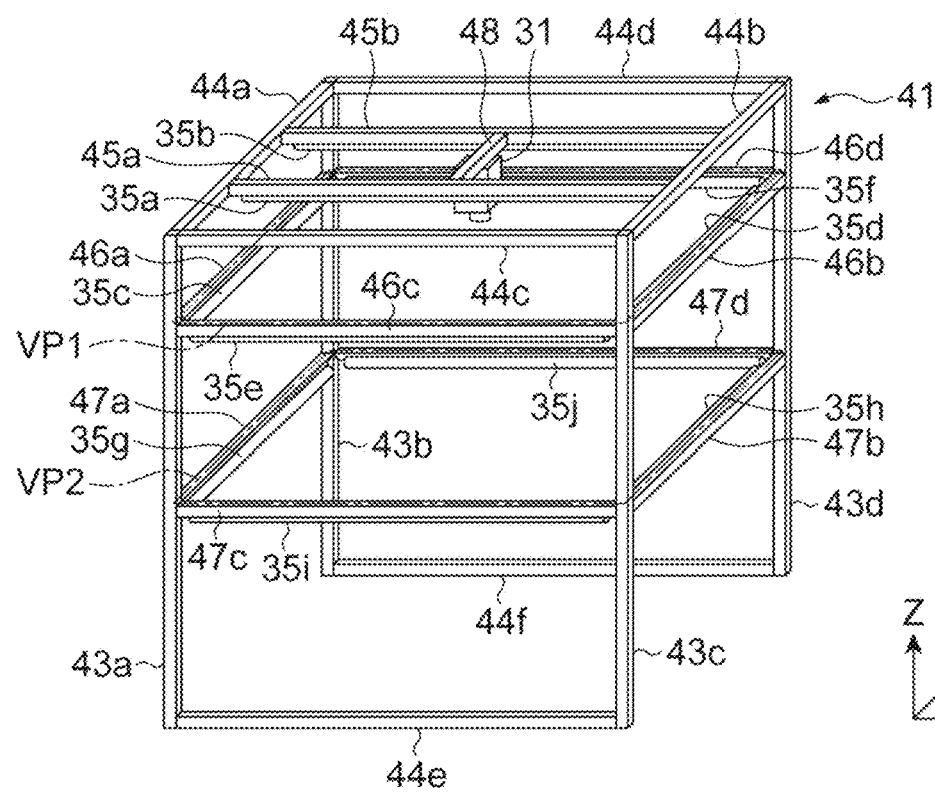

Fig.14
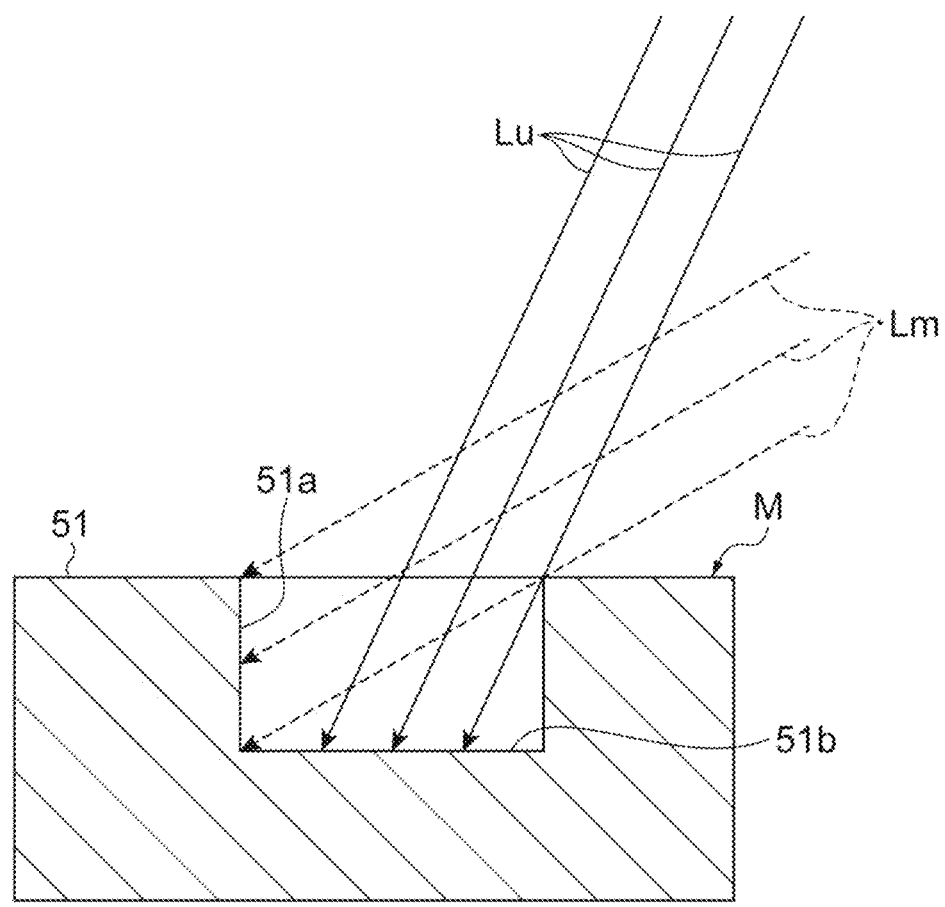
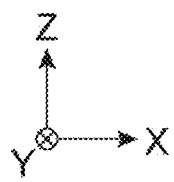

Fig.15 (a)
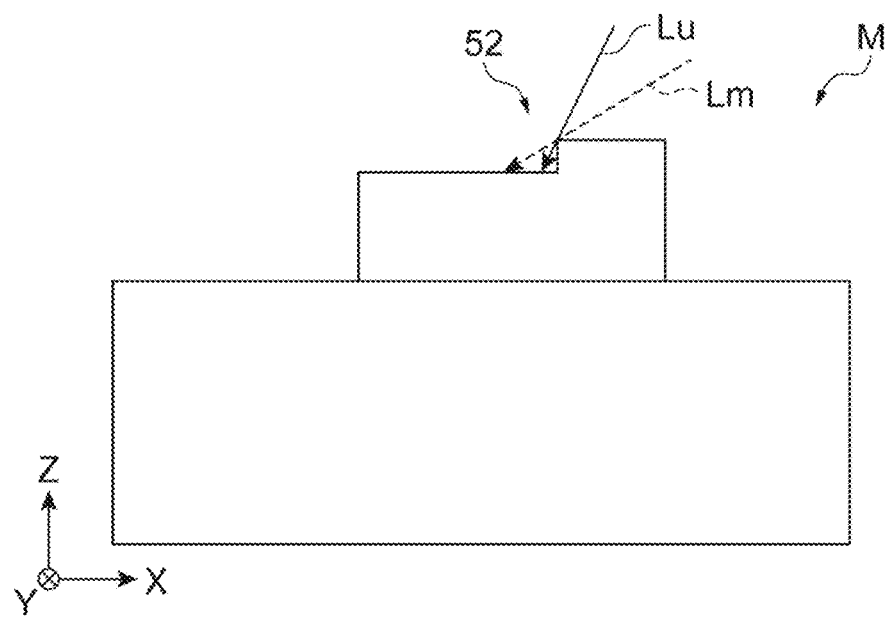
(b)
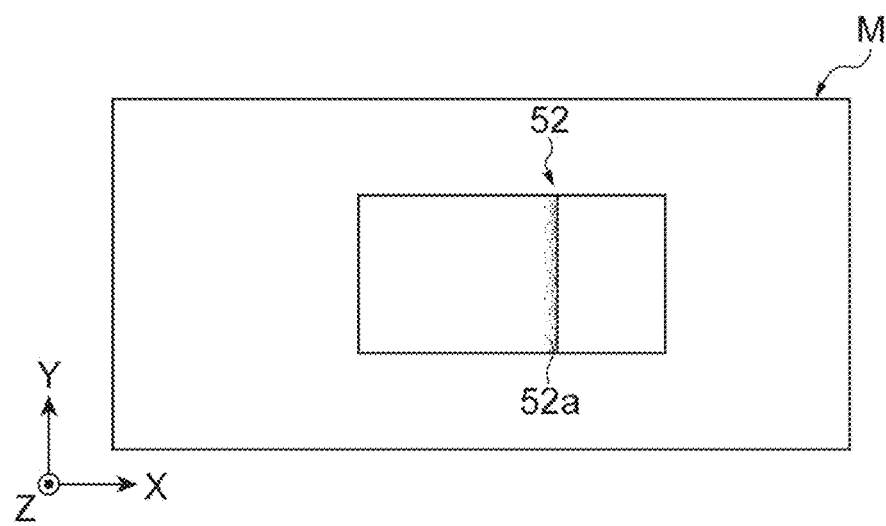
(c)
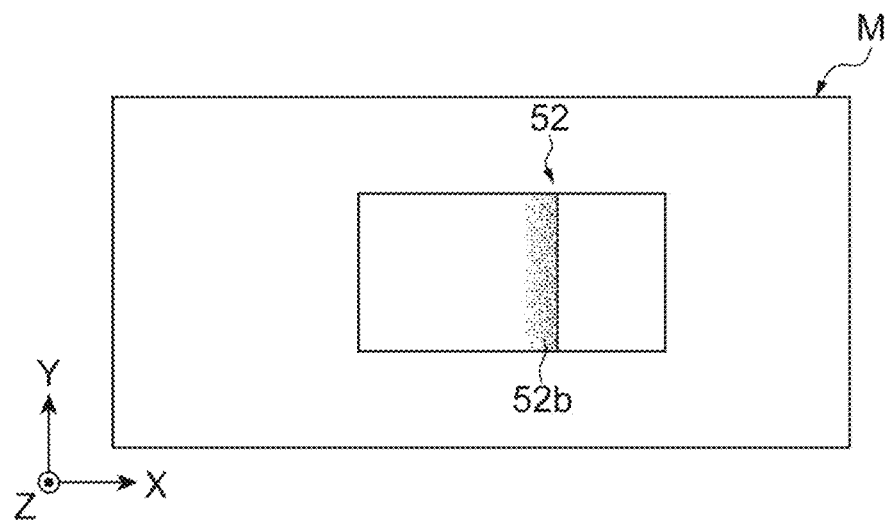

INSPECTION DEVICE AND CASTING SYSTEM

TECHNICAL FIELD

The present disclosure relates to an inspection device and a casting system.

BACKGROUND ART

Conventionally, there is known an inspection device that inspects the appearance of a target. For example, Patent Literature 1 describes a visual inspection device including an illuminating unit that applies light to a target while the light illumination direction is being changed, an imaging control unit that images a target while changing the light illumination direction and hence acquires a plurality of individual inspection images, and an inspection unit that generates a synthetic inspection image from the plurality of individual inspection images and inspects the appearance of the target based on the synthetic inspection image and a reference image prepared in advance. In this visual inspection device, a plurality of light emitting units is disposed diagonally above the target. The light emitting units are turned on or off, and hence the light illumination direction is changed.

CITATION LIST

Patent Literature

Patent Literature 1: Japanese Unexamined Patent Publication No. 2015-68668

SUMMARY OF INVENTION

Technical Problem

In the visual inspection device described in Patent Literature 1, the plurality of light emitting units is disposed at the same height. Thus, light is not sometimes applied to a part of the surface of a target depending on the shape of the target. For example, in the case in which a target has a step, the target possibly has a part where no light is applied to the surface of the target. In the case in which a target has defects, such as cracks, chips, and unnecessary projections (burrs), the detection of a defect sometimes fails depending on light incident angle.

In the present technical field, the improvement of inspection accuracy is desired.

Solution to Problem

An inspection device according to an aspect of the present disclosure is an inspection device that inspects the appearance of a target. This inspection device includes: an imaging device configured to image the target from a first direction; an illuminating unit configured to apply light to the target in a first illumination pattern in which light is applied to the target from a first position and in a second illumination pattern in which light is applied to the target from a second position different from the first position; and a controller configured to acquire a first inspection image by causing the imaging device to image the target to which light is applied in the first illumination pattern, the controller being configured to acquire a second inspection image by causing the imaging device to image the target to which light is applied in the second illumination pattern, the controller being configured to inspect an appearance of the target based on the first inspection image, the second inspection image, and a reference image provided in advance. The first position and the second position overlap each other when viewed from the first direction.

In this inspection device, the target to which light is applied in the first illumination pattern and the second illumination pattern is imaged from the first direction, and hence the first inspection image and the second inspection image are acquired. The appearance of the target is inspected based on the first inspection image, the second inspection image, and the reference image. The light in the first illumination pattern is applied from the first position, and the light in the second illumination pattern is applied from the second position. The first position is different from the second position, and the positions overlap each other when viewed from the first direction. That is, in the first illumination pattern and the second illumination pattern, light is applied to the target from the same direction when viewed from the first direction. However, the light incident angle to the target in the first illumination pattern is different from the light incident angle to the target in the second illumination pattern. Thus, the part to which no light is applied can be reduced on the surface of the target. Accordingly, the inspection range can be increased. In the case in which a target has defects, such as cracks, chips, and unnecessary projections (burrs), light is applied at different incident angles, and hence the shadow of the defect can be more reliably imaged. Thus, the detection accuracy of defects can be improved. From the description above, the inspection accuracy of the target can be improved.

The illuminating unit may include a first lighting device provided at the first position, and a second lighting device provided at the second position. In this case, only by turning on the first lighting device and turning off the other lighting devices, the first illumination pattern is obtained. Similarly, only by turning on the second lighting device and turning off the other lighting devices, the second illumination pattern is obtained. As described above, control and structures that generate illumination patterns can be made simple.

The illuminating unit may include a first lighting device, and an elevator device configured to carry the first lighting device up and down along the first direction. In this case, the number of the lighting devices can be reduced.

The illuminating unit may further apply light to the target in a third illumination pattern in which light is applied to the target from a third position and in a fourth illumination pattern in which light is applied to the target from a fourth position different from the third position. The controller may acquire a third inspection image by causing the imaging device to image the target to which light is applied in the third illumination pattern, the controller may acquire a fourth inspection image by causing the imaging device to image the target to which light is applied in the fourth illumination pattern, and the controller may inspect the appearance of the target further based on the third inspection image and the fourth inspection image. The third position and the fourth position may overlap each other when viewed from the first direction. The first position and the third position may be positions different from each other on a first plane intersecting with the first direction. The second position and the fourth position may be positions different from each other on a second plane intersecting with the first direction. In this case, in the first illumination pattern and the third illumination pattern, light is applied to the target from different directions when viewed from the first direction.

Similarly, in the second illumination pattern and the fourth illumination pattern, light is applied to the target from different directions when viewed from the first direction. In the third illumination pattern and the fourth illumination pattern, light is applied to the target from the same direction when viewed from the first direction. However, the light incident angle to the target in the third illumination pattern is different from the light incident angle to the target in the fourth illumination pattern. Thus, in the third illumination pattern and the fourth illumination pattern, light is applied to the target from directions different from the first illumination pattern and the second illumination pattern when viewed from the first direction. Thus, the inspection range can be further increased, and the detection accuracy of defects can be further improved. As a result, the inspection accuracy of a target can be further improved.

The illuminating unit may include a third lighting device provided at the third position, and a fourth lighting device provided at the fourth position. In this case, only by turning on the third lighting device and turning off the other lighting devices, the third illumination pattern is obtained. Similarly, only by turning on the fourth lighting device and turning off the other lighting devices, the fourth illumination pattern is obtained. As described above, control and structures that generate illumination patterns can be made simple.

The controller may create a first partial defect image showing a defect of the target by comparing the first inspection image with a first reference image provided in advance for the first illumination pattern, the defect being detected in the first illumination pattern. The controller may create a second partial defect image showing a defect of the target by comparing the second inspection image with a second reference image provided in advance for the second illumination pattern, the defect being detected in the second illumination pattern. The controller may create a defect image showing a defect of the target based on the first partial defect image and the second partial defect image. The shadows produced on the target and the luminance distribution on the surface of the target, for example, sometimes vary depending on the light incident angle relative to the target. Thus, the first reference image provided for the first illumination pattern is compared with the first inspection image, the second reference image provided for the second illumination pattern is compared with the second inspection image, and hence the inspection accuracy of a target can be further improved.

The controller may select, as the first reference image, an image having a color closest to a color of the first inspection image from a plurality of images provided in advance. The colors of captured images sometimes vary due to the state of the target, the state of the illuminating unit, and the state of the imaging device, for example, even though the same target is imaged. Thus, the image having the closest color is used as the first reference image, and hence the possibility that a defect is wrongly detected can be reduced. As a result, the inspection accuracy of a target can be further improved.

The controller may generate a first differential image based on the first reference image and the first inspection image, the controller may identify a pseud-defect in defects obtained by analysis of the first differential image based on a feature value of an image region included in the first inspection image corresponding to the defect, and the controller may eliminate the pseud-defect from the first differential image to create the first partial defect image. Light is sometimes reflected by the surface of the target. The luminance of the part where reflection occurs is sometimes increased in the inspection image due to the influence of this reflection. Thus, there is a possibility that this part is detected as a defect. For example, it is determined whether reflection occurs based on the feature value of that part in the inspection image, the part where reflection occurs is eliminated as a pseud-defect from the first differential image, and hence wrong detection of a defect can be reduced.

The inspection device may further include a housing configured to accommodate the imaging device and the illuminating unit. The illuminating unit may apply light to the target disposed in the housing. In this case, a possibility that light from a light source different from the illuminating unit is applied the target can be reduced. Thus, the influence of the external environment on inspection can be reduced, and hence the inspection accuracy of a target can be further improved.

The target may be a mold. The controller may eliminate reflection due to a mold release agent from the inspection image, and the controller may inspect an appearance of the mold based on the inspection image from which the reflection is eliminated and the reference image. In producing the mold, a mold release agent is sometimes used. When the mold release agent remains on the surface of the mold, there is a possibility that light is reflected by the mold release agent. The luminance of the part where the mold release agent remains is sometimes increased in the inspection image due to the influence of this reflection. Thus, there is a possibility that this part is detected as a defect. On the other hand, reflection is eliminated from the inspection image, and hence wrong detection of a defect can be reduced.

A casting system according to another aspect of the present disclosure is a casting system configured to produce a cast, the system including: the inspection device; a transport device configured to transport the mold from a molding machine to a pouring machine through the inspection device, the molding machine being configured to produce the mold, the pouring machine being configured to pour a molten metal into the mold; and a line controller configured to control the casting system. The inspection device inspects the mold being transported by the transport device as the target, and outputs an inspection result to the line controller.

In the casting system, the inspection accuracy of the mold can be improved.

The line controller may control the pouring machine so as not to perform pouring to the mold showing that the inspection result is abnormal. Even though pouring is performed on a mold having a defect, a cast having the defect is produced. Thus, no pouring is performed on the mold showing that the inspection result is abnormal, and hence the defective rate of casts can be reduced, and the production efficiency of casts can be improved.

The casting system may further include a display device configured to display the inspection result. In this case, the inspection result of the mold can be recognized to the operator. Thus, the operator can perform a task suitable for the inspection result. For example, in the case in which the operator sets a core on a mold, the operator can set a core on a mold showing that the inspection result is normal, whereas the operator can set no core on a mold showing that the inspection result is abnormal.

The line controller may store mold information associating the inspection result with a molding condition of the mold. The line controller may analyze the mold information to acquire the molding condition having a correlation with the mold showing that the inspection result is normal. The line controller may control the molding machine so as to perform molding under the acquired molding condition. In this case, the manufacturing accuracy of molds can be improved. As a result, the production efficiency of casts can be improved.

The line controller may store mold information associating the inspection result with a sand property in molding the mold. The line controller may analyze the mold information to acquire the sand property having a correlation with the mold showing that the inspection result is normal. The line controller may control the molding machine so as to perform molding according to the acquired sand property. In this case, the manufacturing accuracy of molds can be improved. As a result, the production efficiency of casts can be improved.

Advantageous Effects of Invention

According to the aspects and the embodiments of the present disclosure, inspection accuracy can be improved.

BRIEF DESCRIPTION OF DRAWINGS

FIG. 2 is a diagram of an exemplary mold management table.

FIG. 4(a) is a perspective view schematically showing the appearance of the housing of the inspection device shown in FIG. 3.

FIG. 4(b) is a view showing the disposition of an imaging device and a lighting device shown in FIG. 3.

FIG. 14 is a diagram showing the differences in illumination ranges between an upper illumination pattern and a middle illumination pattern.

FIG. 15(a) is a diagram showing the differences in defect detection between an upper illumination pattern and a middle illumination pattern.

FIG. 15(b) is a plan view of a mold to which light is applied in an upper illumination pattern.

FIG. 15(c) is a plan view of a mold to which light is applied in a middle illumination pattern.

DESCRIPTION OF EMBODIMENTS

In the following, an embodiment of the present disclosure will be described in detail with reference to the drawings. Note that in the description of the drawings, the same elements are designated with the same reference signs, and the duplicate description is omitted.

Figure 1:
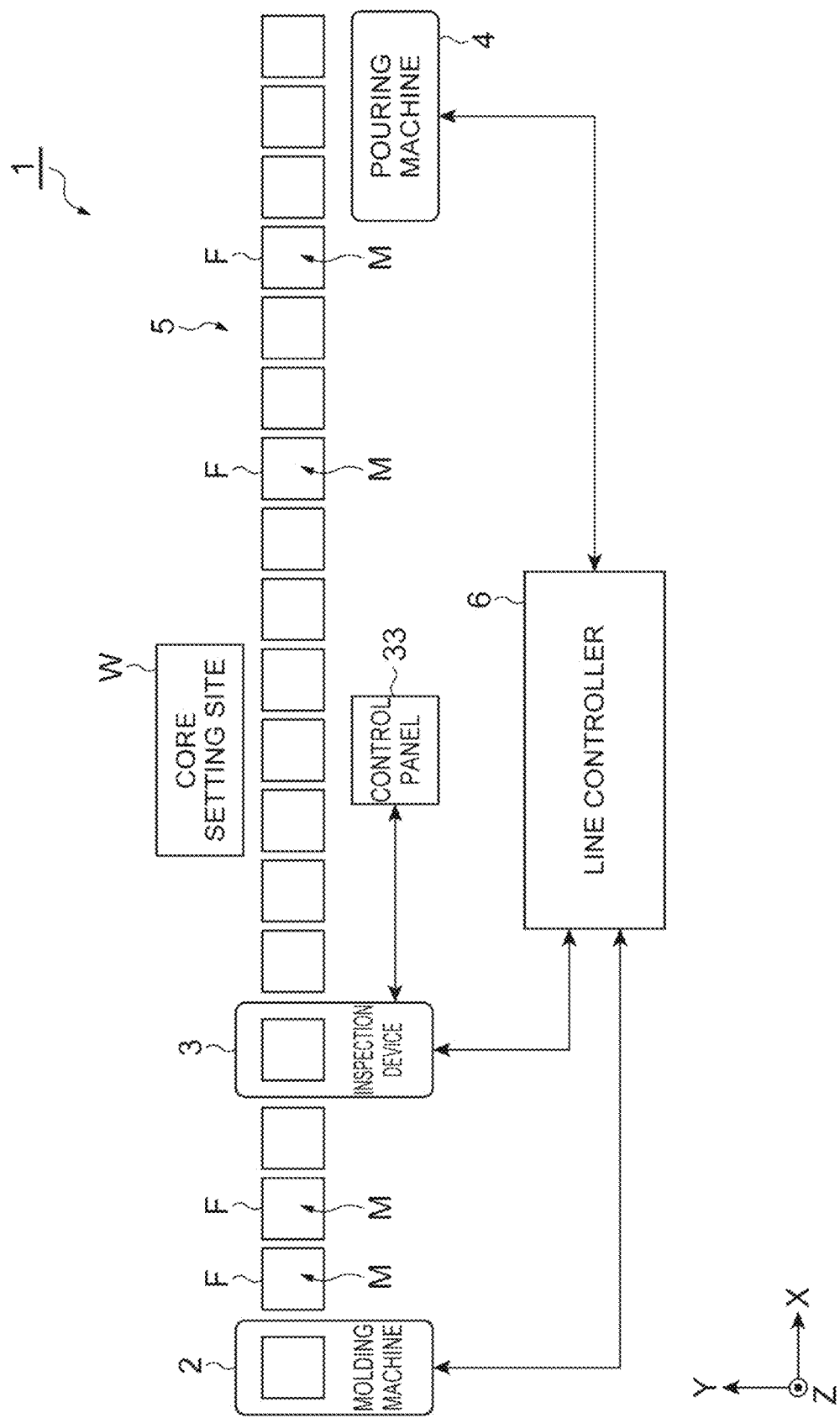
FIG. 1 is a configuration diagram schematically showing a casting system including an inspection device according to an embodiment.

FIG. 1 is a configuration diagram schematically showing a casting system including an inspection device according to an embodiment. A casting system 1 shown in FIG. 1 is a system that produces casts. The casting system 1 includes a molding machine 2, an inspection device 3, a pouring machine 4, a transport device 5, and a line controller 6.

The molding machine 2 is a device that produces a mold M. In the embodiment, the mold M is formed using a flask F. Upon the reception of a molding start signal and mold information from the line controller 6, the molding machine 2 starts the production of the mold M in a molding area. The molding machine 2 produces the mold M shown by a pattern code included in the mold information received from the line controller 6. The pattern code is information that uniquely describes the molding pattern. The molding machine 2 throws sand into the flask F provided with a pattern (not shown), applies pressure to the sand in the flask F, and solidifies the sand. The molding machine 2 ejects the pattern out of the solidified sand, and hence forms the mold M. In ejecting the pattern, a mold release agent is sometimes used. The color of the mold M is black, for example. Note that the molding machine 2 may be configured in which the molding machine 2 receives signals that specify the molding conditions and the sand properties from the line controller 6, sets a mixer to have the specified sand properties, and produces the mold M under the specified molding conditions.

The molding machine 2 sends a molding state signal and a molding result signal to the line controller 6. The molding state signal is a signal that indicates whether the molding machine 2 is under molding operation. The molding result signal is a signal that indicates a molding result as to whether the molding machine 2 is normally operated. When the molding machine 2 is under molding operation, the molding machine 2 keeps sending a molding state signal indicating that the molding machine 2 is under molding operation to the line controller 6. When molding is completed, the molding machine 2 sends a molding state signal indicating that the molding machine 2 is not under molding operation and the molding result signal to the line controller 6. During no molding operation, the molding machine 2 keeps sending the molding state signal indicating that the molding machine 2 is not under molding operation to the line controller 6.

The inspection device 3 is a device that inspects the appearance of the mold M produced by the molding machine 2. Specifically, upon the reception of the inspection start signal and the mold information from the line controller 6, the inspection device 3 inspects the mold M located in the inspection area. The inspection device 3 identifies the type of the mold M that is an inspection target based on the pattern code included in the mold information received from the line controller 6, and inspects the mold M according to the type of the mold M.

The inspection device 3 sends an inspection state signal and an inspection result signal to the line controller 6. The inspection state signal is a signal that indicates whether the inspection device 3 is under inspection operation. The inspection result signal is a signal that indicates an inspection result as to whether the mold M that is an inspection target is normal. While the inspection device 3 is under inspection operation, the inspection device 3 keeps sending an inspection state signal indicating that the inspection device 3 is under inspection operation to the line controller 6. When inspection is completed, the inspection device 3 sends an inspection state signal indicating that the inspection device 3 is not under inspection operation and the inspection result signal to the line controller 6. During no inspection, the inspection device 3 keeps sending the inspection state signal indicating that the inspection device 3 is not under inspection operation to the line controller 6. The detail of the inspection device 3 will be described later.

The pouring machine 4 is a device that pours a molten metal into the mold M. Upon the reception of a flask feed completion signal and mold information from the line controller 6, the pouring machine 4 pours a molten metal into the mold M (performs pouring) with the mold M located in the pouring area as a pouring target. The pouring machine 4 identifies the type of the mold M that is a pouring target based on the pattern code included in the mold information received from the line controller 6, and pours the molten metal suitable for the type of the mold M. The pouring machine 4 may pour a molten metal into the mold M based on the inspection result included in mold information. For example, when the inspection result is normal, the pouring machine 4 pours a molten metal into the mold M, whereas when the inspection result is abnormal, the pouring machine 4 does not pour a molten metal into the mold M. The pouring machine 4 keeps sending a flask feed/non-feed signal indicating that no flask is feedable to the line controller 6 until the completion of pouring a molten metal into the mold M that is a pouring target. Note that the flask feed/non-feed signal is a signal that indicates whether the flask is feedable.

The transport device 5 is a device that transports the flask F (the mold M) from the molding machine 2 to the pouring machine 4 through the inspection device 3. The transport device 5 has a rail, not shown, for example. The rail linearly extends from the molding machine 2 to the pouring machine 4. The transport device 5 in turn transports a plurality of flasks F arranged on the rail at regular intervals (pitches) from the molding machine 2 to the pouring machine 4. The transport device 5 is intermittently driven, and transports the flasks F one pitch at a time. The transport device 5 includes, for example, a pusher device disposed on the molding machine 2 side and a cushion device disposed on the pouring machine 4 side. Upon the reception of the flask feed signal from the line controller 6, the transport device 5 transports the flasks F at one pitch. Upon the completion of one pitch transport, the transport device 5 fixes the flasks F with a clamp, not shown, and sends a flask feed completion signal to the line controller 6.

Note that between the inspection device 3 and the pouring machine 4, a core setting site W is provided. On the core setting site W, an operator is stationed, and sets a core on the mold M.

The line controller 6 is a controller that controls the casting system 1 overall. The line controller 6 is configured as a computer system including, for example, a processor, such as a central processing unit (CPU), a memory such as a random access memory (RAM) and a read only memory (ROM), an input device, such as a touch panel, a mouse, and a keyboard, an output device, such as a display, and a communication device, such as a network card. The line controller 6 is a programmable logic controller (PLC), for example. The pieces of hardware are operated under control of the processor based on computer programs stored on the memory, and hence the functions of the line controller 6 are implemented.

The line controller 6 includes a mold management table that manages the pieces of mold information on the molds M. As shown in FIG. 2, the mold management table stores mold information that associates a "mold ID" with a "pattern code", an "inspection result", and a "position" for each of the molds M. The "mold ID" is information that can uniquely identify a mold M. The "pattern code" is the information that uniquely indicates the molding pattern used for producing the mold M identified by the corresponding mold ID. The "inspection result" is information that indicates the inspection result of the mold M identified by the corresponding mold ID. In an example in FIG. 2, "OK", "NG", and "Fail" are used as inspection results. In the case in which the inspection result is "OK", this indicates that the mold M is normal. In the case in which the inspection result is "NG", this indicates that the mold M is abnormal (the mold M has a defect). In the case in which the inspection result is "Fail", this indicates that inspection itself fails.

The "position" indicates the position on the transport path on which the mold M identified by the corresponding mold ID is disposed. In the casting system 1, positions P1 to P19 are set on the transport path. The position P1 is located on the uppermost stream in the transport direction of the transport device 5, and the positions are moved downstream in order of the position P2, the position P3, and so on one pitch at a time. The position P1 is a molding area where molding is performed by the molding machine 2. The positions P2 to P4 are positions between the molding machine 2 and the inspection device 3. The position P5 is an inspection area where inspection is performed by the inspection device 3. The positions P6 to P17 are positions between the inspection device 3 and the pouring machine 4. The position P9 is the position of the mold M corresponding to the inspection result displayed on the monitor (the display) of a control panel 33, described later. The position P18 is a pouring area where pouring is performed by the pouring machine 4. The position P19 is a position where the flask F is unloaded from the casting system 1.

The line controller 6 advances the "position" of information on each mold by one every time when receiving a flask feed completion signal from the transport device 5, for example, and adds new mold information to the mold management table. On the added mold information, the position P1 is set to the "position". Note that when a flask F present at the position P19 is fed, the flask F is unloaded from the casting system 1, and hence the "position" of mold information on the mold M on the flask F is blank. When the line controller 6 sends a molding start signal to the molding machine 2, the line controller 6 allocates a new mold ID to the "mold ID" of mold information having the positional information of the position P1, and registers the pattern code of the mold M to be produced by the molding machine 2 on the "pattern code" of mold information having the positional information of the position P1. Upon the reception of an inspection result signal from the inspection device 3, the line controller 6 registers the inspection result indicated by the inspection result signal on the "inspection result" of mold information having the positional information of the position P5.

In the case in which the line controller 6 determines that the flask is feedable, the line controller 6 sends a flask feed signal to the 5, transport device 5. The line controller 6 determines that the flask is feedable in the case in which the line controller 6 receives a molding state signal indicating that the molding machine 2 is not under molding operation from the molding machine 2, receives an inspection state signal indicating that the inspection device 3 is not under inspection operation from the inspection device 3, and receives a flask feed/non-feed signal indicating that the flask is feedable from the pouring machine 4. That is, the line controller 6 sends no flask feed signal to the transport device 5 in the case in which at least any one condition is satisfied in which the line controller 6 receives the molding state signal indicating that the molding machine 2 is under molding operation from the molding machine 2, the inspection state signal indicating that the inspection device 3 is under inspection operation from the inspection device 3, or the flask feed/non-feed signal indicating that no flask is feedable from the pouring machine 4. Upon the reception of a flask feed completion signal from the transport device 5, the line controller 6 sends s molding start signal and mold information on the position P1 to the molding machine 2, sends an inspection start signal and mold information on the position P5 to the inspection device 3, and sends a flask feed completion signal and mold information on the position P18 to the pouring machine 4. The line controller 6 may send signals that specify the molding conditions and the sand properties to the molding machine 2. The line controller 6 may control the pouring machine 4 such that the pouring machine 4 does not pour a molten metal into the mold M showing an abnormal inspection result by the inspection device 3.

Figure 3:
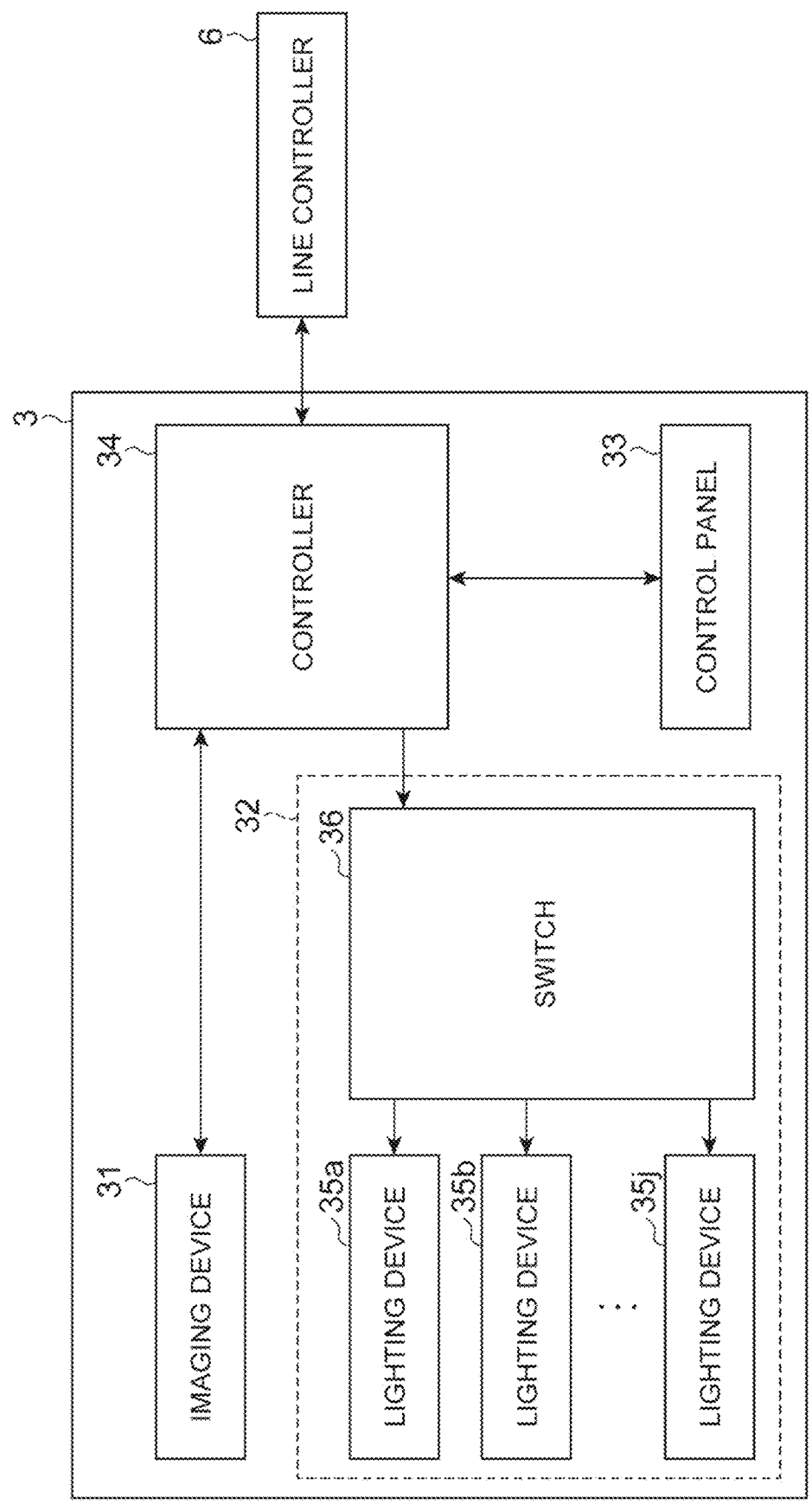
FIG. 3 is a configuration diagram schematically showing the inspection device shown in FIG. 1.
Figure 5:
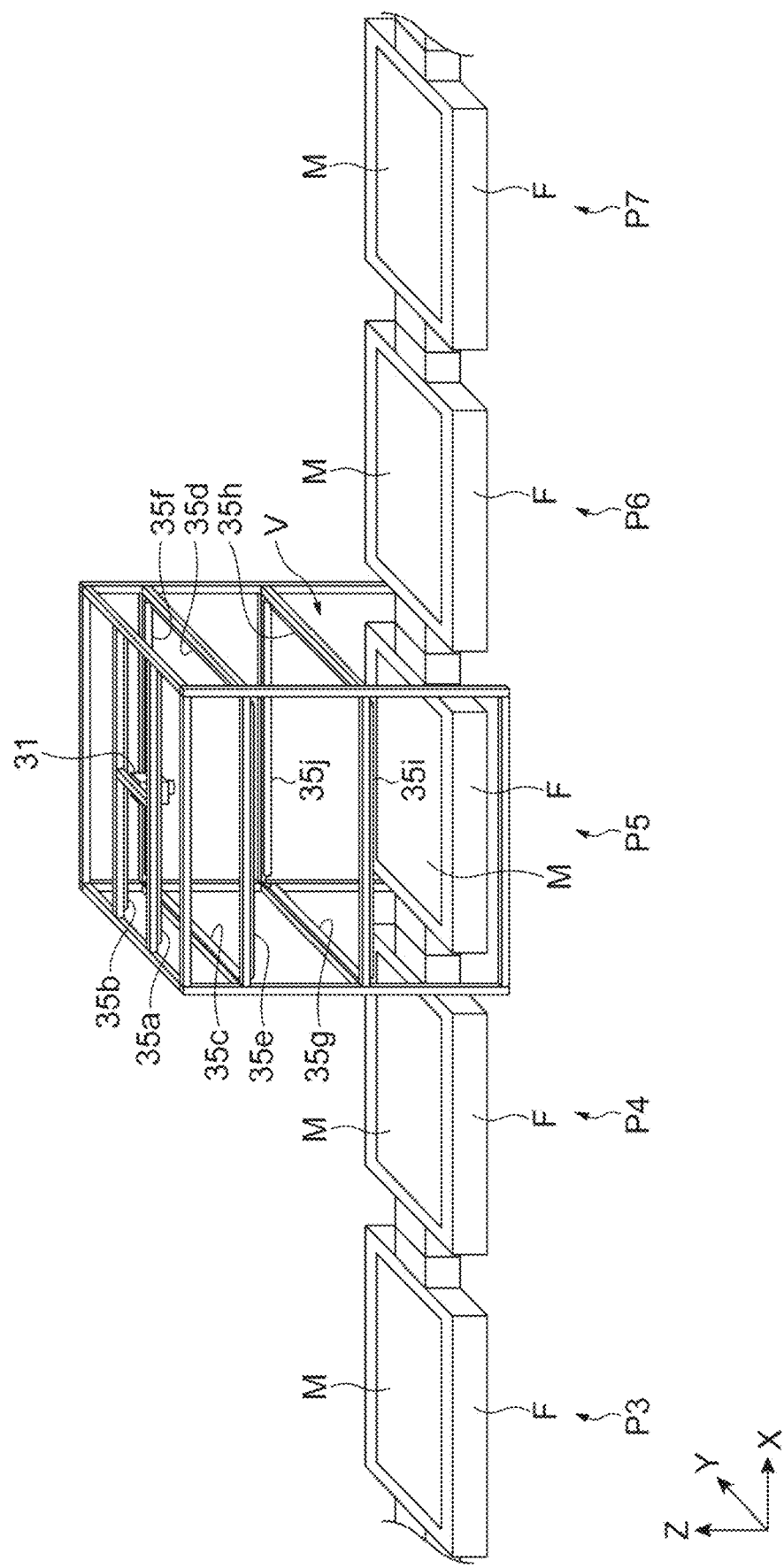
FIG. 5 is a perspective view schematically showing areas around an inspection area.

Next, referring to FIGS. 3 to 5, the detail of the inspection device 3 will be described. FIG. 3 is a configuration diagram schematically showing the inspection device shown in FIG. 1. FIG. 4(a) is a perspective view schematically showing the appearance of the housing of the inspection device shown in FIG. 3. FIG. 4(b) is a view showing the disposition of an imaging device and a lighting device shown in FIG. 3. FIG. 5 is a perspective view schematically showing areas around an inspection area. As shown in FIGS. 3 to 5, the inspection device 3 includes a housing 30, an imaging device 31, an illuminating unit 32, a control panel 33, and a controller 34. Note that in FIG. 1, for convenience of explanation, the control panel 33 is disposed on the outside of the inspection device 3.

The housing 30 has a hollow box shape, and forms an imaging space V. The housing 30 accommodates the imaging device 31 and the illuminating unit 32 in the imaging space V. The housing 30 includes a frame body 41 and a cover 42. The frame body 41 has a plurality of pillar members (here, pillar members 43a to 43d), a plurality of coupling members (here, coupling members 44a to 44f), a plurality of mounting members for ceiling area lighting (here, mounting members 45a and 45b), a plurality of mounting members for upper area lighting (here, mounting members 46a to 46d), a plurality of mounting members for middle area lighting (here, mounting members 47a to 47d), and a mounting member 48 for the imaging device 31. The frame body 41 is formed in a rectangular cuboid shape. Note that in the description of the inspection device 3, vertical, longitudinal, and lateral directions mean the orientations that the side where the imaging device 31 is provided is the upper side, the side where the flask F is transported is the lower side, the upstream side of the transport direction of the transport device 5 is the front side, and the downstream side of the transport direction is the rear side.

The pillar members 43a to 43d are erected from a floor surface along the Z-axis direction (in the first direction). The pillar members 43a and 43b are disposed so as to sandwich the transport path of the transport device 5 in the Y-axis direction, and the top ends of the pillar members 43a and 43b are joined to each other with the coupling member 44a. Similarly, the pillar members 43d and 43d are disposed so as to sandwich the transport path of the transport device 5 in the Y-axis direction, and the top ends of the pillar members 43d and 43d are joined to each other with the coupling member 44b. The pillar members 43a and 43d are disposed on one side (the left side) of the Y-axis direction to the transport path of the transport device 5, and arranged in the X-axis direction. The top and lower ends of the pillar members 43a and 43d are respectively joined to each other with the coupling members 44c and 44e. Similarly, the pillar members 43b and 43d are disposed on the other side (the right side) of the Y-axis direction to the transport path of the transport device 5, and arranged in the X-axis direction. The top and lower ends of the pillar members 43b and 43d are respectively joined to each other with the coupling members 44d and 44f.

A pair of the mounting members 45a and 45b is arranged in the Y-axis direction, and extends along the X-axis direction. One ends of the mounting members 45a and 45b are fixed to the coupling member 44a, and the other ends of the mounting members 45a and 45b are fixed to the coupling member 44b. The mounting members 46a to 46d are disposed on a virtual plane VP1 (a first plane) that intersects with (here, orthogonal to) the Z-axis direction, forming a flame in a nearly square shape. The plane VP1 is located near the ceiling of the housing 30 in the Z-axis direction. The mounting member 46a extends along the Y-axis direction. One end of the mounting member 46a is fixed to the pillar member 43a. The other end of the mounting member 46a is fixed to the pillar member 43b. The mounting member 46b extends along the Y-axis direction. One end of the mounting member 46b is fixed to the pillar member 43d. The other end of the mounting member 46b is fixed to the pillar member 43d. The mounting member 46c extends along the X-axis direction. One end of the mounting member 46c is fixed to the pillar member 43a. The other end of the mounting member 46c is fixed to the pillar member 43d. The mounting member 46d extends along the X-axis direction. One end of the mounting member 46d is fixed to the pillar member 43b. The other end of the mounting member 46d is fixed to the pillar member 43d.

The mounting members 47a to 47d are disposed on a virtual plane VP2 (a second plane) that intersects with (here, orthogonal to) the Z-axis direction, forming a flame in a nearly square shape. The plane VP2 is located closer to the floor surface than the plane VP1 in the Z-axis direction, and located near the middle of the housing 30. The mounting member 47a extends along the Y-axis direction. One end of the mounting member 47a is fixed to the pillar member 43a. The other end of the mounting member 47a is fixed to the pillar member 43b. The mounting member 47b extends along the Y-axis direction. One end of the mounting member 47b is fixed to the pillar member 43d. The other end of the mounting member 47b is fixed to the pillar member 43d. The mounting member 47c extends along the X-axis direction. One end of the mounting member 47c is fixed to the pillar member 43a. The other end of the mounting member 47c is fixed to the pillar member 43d. The mounting member 47d extends along the X-axis direction. One end of the mounting member 47d is fixed to the pillar member 43b. The other end of the mounting member 47d is fixed to the pillar member 43d. The mounting member 48 extends along the Y-axis direction. One end of the mounting member 48 is fixed to the center part of the mounting member 45a in the X-axis direction. The other end of the mounting member 48 is fixed to the center part of the mounting member 45b in the X-axis direction.

The cover 42 is a part that covers the outer side of the frame body 41. The cover 42 includes cover members 42a to 42e. The cover member 42a covers the face defined by the pillar member 43a, the pillar member 43b, and the coupling member 44a. The cover member 42a does not extend to the floor surface, and an opening 42f through which the flask F can pass is provided between the lower end of the cover member 42a and the floor surface. The cover member 42b covers the face defined by the pillar member 43d, the pillar member 43d, and the coupling member 44b. The cover member 42b does not extend to the floor surface, and an opening 42g through which the flask F can pass is provided between the lower end of the cover member 42b and the floor surface. The cover member 42c covers the face defined by the pillar member 43a, the pillar member 43d, the coupling member 44c, and the coupling member 44e. The cover member 42d covers the face defined by the pillar member 43b, the pillar member 43d, the coupling member 44d, and the coupling member 44f. The cover member 42e covers the face defined by the coupling members 44a to 44d.

The cover 42 further includes shutter members 42h and 42i that prevent external light from entering the imaging space V. The shutter member 42h is slidably provided on the cover member 42a in the Z-axis direction. The shutter member 42h can take a closed state in which the opening 42f is closed and the opened state in which the opening 42f is opened. The state of the shutter member 42h is controlled in the closed state or the opened state by the controller 34. The shutter member 42h closes the opening 42f when the inspection device 3 is under inspection operation, and opens the opening 42f when the flask is fed. The shutter member 42i is slidably provided on the cover member 42b in the Z-axis direction. The shutter member 42i can take a closed state in which the opening 42g is closed and an opened state in which the opening 42g is opened. The state of the shutter member 42i is controlled in the closed state or the opened state by the controller 34. The shutter member 42i closes the opening 42g when the inspection device 3 is under inspection operation, and opens the opening 42g when the flask is fed.

Note that in the embodiment, when the shutter members 42h and 42i close the openings 42f and 42g, the lower ends of the shutter members 42h and 42i contact the coupling units that join two adjacent flasks F, and hence a gap can be formed between the lower ends of the shutter members 42h and 42i and the floor surface. Thus, the lower ends of the shutter members 42h and 42i may be provided with a recess into which the coupling unit is fit. The coupling unit may be configured such that in the Z-axis direction, the top face of the coupling unit is located below the surface of the mold M. The shapes of the shutter members 42h and 42i can be appropriately changed according to the shape of the flask F and the shape of the transport path, for example.

The imaging device 31 is a device that images a mold M formed on the flask F located in the inspection area (the position P5) (imaging the mold M). The imaging device 31 is a camera, for example. In the embodiment, the imaging device 31 is installed at the center of the mounting member 48 in the Y-axis direction, and located at the center of the ceiling part of the housing 30. The lens of the imaging device 31 is directed downward from the ceiling part, and the imaging device 31 images the flask F from above the flask F along the Z-axis direction. The imaging range of the imaging device 31 is preset such that at least the surface (the entire top face) of the mold M located in the inspection area is imaged. Upon the reception of an imaging instruction from the controller 34, the imaging device 31 performs imaging to acquire an image. The imaging device 31 outputs the acquired image to the controller 34.

The illuminating unit 32 applies light to the mold M disposed in the housing 30 in a plurality of illumination patterns. The illuminating unit 32 includes a plurality of lighting devices (here, lighting devices 35a to 35j) and a switch 36.

The lighting devices 35a to 35j are bar-shaped lighting devices.

The lighting devices 35a to 35j comprise light emitting diodes (LEDs), for example. The lighting devices 35a and 35b are installed on the under surfaces of the mounting members 45a and 45b, respectively. That is, the lighting devices 35a and 35b are arranged in the Y-axis direction, sandwiching the imaging device 31, and extend from the coupling member 44a to the coupling member 44b along the X-axis direction.

The lighting devices 35c to 35f are installed on the inner surfaces of the mounting members 46a to 46d, respectively. That is, the lighting devices 35c to 35f are upper lighting devices, and disposed on the plane VP1. The lighting devices 35c to 35f are disposed so as to surround the flask F disposed at the position P5. Specifically, the lighting device 35c is provided at the front end of the imaging space V on the plane VP1, and extends from the pillar member 43a to the pillar member 43b along the Y-axis direction. The lighting device 35d is provided at the rear end of the imaging space V on the plane VP1, and extends from the pillar member 43d to the pillar member 43d along the Y-axis direction. The lighting device 35e is provided at the left end of the imaging space V on the plane VP1, and extends from the pillar member 43a to the pillar member 43d along the X-axis direction. The lighting device 35f is provided at the right end of the imaging space V on the plane VP1, and extends from the pillar member 43b to the pillar member 43d along the X-axis direction.

The lighting devices 35g to 35j are installed on the inner surfaces of the mounting members 47a to 47d, respectively. That is, the lighting devices 35g to 35j are middle lighting devices, and disposed on the plane VP2. The lighting devices 35g to 35j are disposed so as to surround the flask F disposed at the position P5. Specifically, the lighting device 35g is provided at the front end of the imaging space V on the plane VP2, and extends from the pillar member 43a to the pillar member 43b along the Y-axis direction. The lighting device 35h is provided at the rear end of the imaging space V on the plane VP2, and extends from the pillar member 43d to the pillar member 43d along the Y-axis direction. The lighting device 35i is provided at the left end of the imaging space V on the plane VP2, and extends from the pillar member 43a to the pillar member 43d along the X-axis direction. The lighting device 35j is provided at the right end of the imaging space V on the plane VP2, and extends from the pillar member 43b to the pillar member 43d along the X-axis direction.

The switch 36 is a device that switches the lighting device that is turned on among the lighting devices 35a to 35j. The switch 36 individually turns on or off the lighting devices 35a to 35j based on a switching instruction from the controller 34.

The plurality of illumination patterns includes an observation illumination pattern and an inspection illumination pattern. The observation illumination pattern is obtained by turning on the lighting devices 35a to 35f and turning off the lighting devices 35g to 35j, for example. The inspection illumination pattern includes a plurality of upper illumination patterns (here, four patterns) and a plurality of middle illumination patterns (here, four patterns).

The four upper illumination patterns include: an illumination pattern that applies light from the front position on the plane VP1 by turning on the lighting device 35c and turning off the other lighting devices; an illumination pattern that applies light from the rear position on the plane VP1 by turning on the lighting device 35*d* and turning off the other lighting devices; an illumination pattern that applies light from the lateral position on the plane VP1 by turning on the lighting device 35*e* and turning off the other lighting devices; and an illumination pattern that applies light from the lateral position on the plane VP1 by turning on the lighting device 35*f* and turning off the other lighting devices.

The four middle illumination patterns include: an illumination pattern that applies light from the front position on the plane VP2 by turning on the lighting device 35*g* and turning off the other lighting devices; an illumination pattern that applies light from the rear position on the plane VP2 by turning on the lighting device 35*h* and turning off the other lighting devices; an illumination pattern that applies light from the lateral position on the plane VP2 by turning on the lighting device 35*i* and turning off the other lighting devices; and an illumination pattern that applies light from the lateral position on the plane VP2 by turning on the lighting device 35*j* and turning off the other lighting devices.

The control panel 33 is a device that an operator manipulates the inspection device 3. The control panel 33 is placed on the core setting site W, for example. The control panel 33 includes a monitor (a display device) that displays the inspection result of the mold M by the inspection device 3. The operator sets the core on the mold M according to the inspection result of the inspection device 3 displayed on the monitor of the control panel 33. For example, the operator sets the core on the mold M showing that the inspection result is normal, and the operator does not necessarily have to set the core on the mold M showing that the inspection result is abnormal.

The controller 34 is a device that controls the inspection device 3. The controller 34 is configured as a computer system including a processor, such as a CPU, a memory, such as a RAM and a ROM, and a communication device, such as a network card, for example. The controller 34 is a Personal Computer (PC), for example. The pieces of hardware are operated under control of the processor based on computer programs stored on the memory, and hence the functions of the controller 34 are implemented. The detail of processes executed by the controller 34 will be described later.

Figure 6:
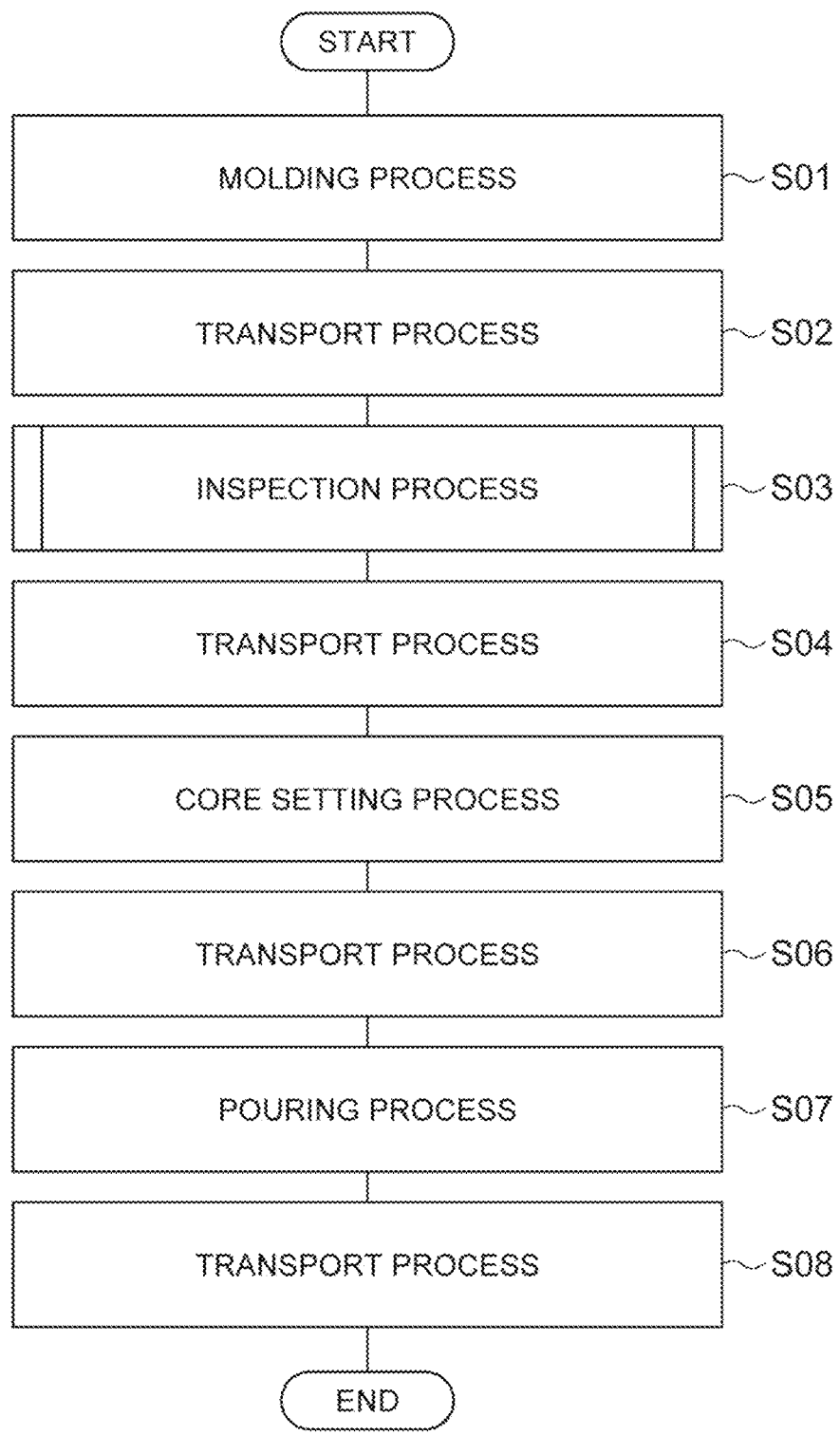
FIG. 6 is a flowchart showing a casting production process of the casting system shown in FIG. 1.

Next, referring to FIG. 6, a casting production process will be described. FIG. 6 is a flowchart showing the casting production process of the casting system shown in FIG. 1. The start of a series of processes shown in FIG. 6 is triggered by the line controller 6 receiving a flask feed completion signal from the transport device 5. Here, a series of processes performed to one flask F will be described as attention is focused on the one flask F.

First, a molding process S01 is performed. In the molding process S01, the line controller 6 sends a molding start signal and mold information on the position P1 to the molding machine 2. Upon the reception of the molding start signal and the mold information from the line controller 6, the molding machine 2 starts the production of the mold M in a type indicated by the pattern code included in the mold information. At this time, the molding machine 2 keeps sending the molding state signal indicating that the molding machine 2 is under molding operation to the line controller 6 until the production of the mold M is completed. Upon the completion of the production of the mold M, the molding machine 2 sends the molding state signal indicating that the molding machine 2 is not under molding operation and the molding result signal indicating the molding result to the line controller 6. After that, during no production of the mold M, the molding machine 2 keeps sending the molding state signal indicating that the molding machine 2 is not under molding operation to the line controller 6.

Subsequently, a transport process S02 is performed. In the transport process S02, the line controller 6 determines whether the flask is feedable. Specifically, the line controller 6 determines that the flask is feedable in the case in which the line controller 6 receives a molding state signal indicating that the molding machine 2 is not under molding operation from the molding machine 2, receives an inspection state signal indicating that the inspection device 3 is not under inspection operation from the inspection device 3, and receives a flask feed/non-feed signal indicating that the flask is feedable from the pouring machine 4. In the case in which the line controller 6 determines that the flask is feedable, the line controller 6 sends a flask feed signal to the transport device 5. Upon the reception of the flask feed signal from the line controller 6, the transport device 5 transports the flasks F at one pitch. Upon the completion of one pitch transport, the transport device 5 fixes the flasks F with a clamp, not shown, and sends a flask feed completion signal to the line controller 6. The process is repeated until the flask F reaches the inspection area (the position P5).

Subsequently, after the flask F reaches the inspection area of the inspection device 3, an inspection process S03 is performed. In the inspection process S03, upon the reception of the inspection start signal and the mold information from the line controller 6, the inspection device 3 identifies the type of the mold M that is an inspection target based on the pattern code included in the mold information, and inspects the mold M located in the inspection area according to the identified type of the mold M. At this time, the molding machine 2 keeps sending the inspection state signal indicating that the inspection device 3 is under inspection operation to the line controller 6 until the inspection of the mold M is completed. Upon the completion of inspection, the inspection device 3 sends an inspection state signal indicating that the inspection device 3 is not under inspection operation and the inspection result signal indicating the inspection result to the line controller 6. After that, during no inspection of the mold M, the inspection device 3 keeps sending the inspection state signal indicating that the inspection device 3 is not under inspection operation to the line controller 6. The detail of the inspection process S03 will be described later.

Subsequently, a transport process S04 is performed. Similarly to the transport process S02, in the transport process S04, the line controller 6 determines whether the flask is feedable. In the case in which the line controller 6 determines that the flask is feedable, the line controller 6 sends a flask feed signal to the transport device 5. Upon the reception of the flask feed signal from the line controller 6, the transport device 5 transports the flasks F at one pitch. Upon the completion of one pitch transport, the transport device 5 fixes the flasks F with a clamp, and sends a flask feed completion signal to the line controller 6. The process is repeated until the flask F reaches the core setting area (the position P9).

Subsequently, after the flask F reaches the core setting area, a core setting process S05 is performed. In the core setting process S0S, the line controller 6 outputs the inspection result of the mold M formed in the flask F located at the position P9 to the control panel 33 through the controller 34, and displays the inspection result on the monitor of the control panel 33. The monitor of the control panel 33 keeps displaying the inspection result during the presence of the flask F in the core setting area. The operator who is stationed at the core setting site W confirms the inspection result displayed on the monitor, and sets the core on the mold M when the inspection result is normal, whereas the operator does not set the core on the mold M when the inspection result is abnormal.

Subsequently, a transport process S06 is performed. Similarly to the transport process S02, in the transport process S06, the line controller 6 determines whether the flask is feedable. In the case in which the line controller 6 determines that the flask is feedable, the line controller 6 sends a flask feed signal to the transport device 5. Upon the reception of the flask feed signal from the line controller 6, the transport device 5 transports the flasks F at one pitch. Upon the completion of one pitch transport, the transport device 5 fixes the flasks F with a clamp and sends a flask feed completion signal to the line controller 6. The process is repeated until the flask F reaches the pouring area (the position P18) of the pouring machine 4.

Subsequently, after the flask F reaches the pouring area of the pouring machine 4, a pouring process S07 is performed. In the pouring process S07, upon the reception of the flask feed completion signal and the mold information from the line controller 6, the pouring machine 4 identifies the type of the mold M that is a pouring target based on the pattern code included in the mold information, and pours the molten metal suitable for the type of the mold M. At this time, the pouring machine 4 pours a molten metal into the mold M when the inspection result included in mold information is normal, whereas the pouring machine 4 does not pour a molten metal into the mold M when the inspection result is abnormal. The pouring machine 4 keeps sending a flask feed/non-feed signal indicating that no flask is feedable to the line controller 6 until the completion of pouring a molten metal into the mold M that is a pouring target. After pouring is completed, the pouring machine 4 sends a flask feed/non-feed signal indicating that the flask is feedable to the line controller 6.

Subsequently, a transport process S08 is performed. Similarly to the transport process S02, in the transport process S08, the line controller 6 determines whether the flask is feedable. In the case in which the line controller 6 determines that the flask is feedable, the line controller 6 sends a flask feed signal to the transport device 5. Upon the reception of the flask feed signal from the line controller 6, the transport device 5 transports the flasks F at one pitch. Upon the completion of transport, the transport device 5 sends a flask feed completion signal to the line controller 6. In this manner, the casting production process using the flask F is ended.

As described above, in the casting system 1, the molding machine 2 produces the mold M, and the inspection device 3 inspects the mold M. The core is set on the mold M showing that the inspection result is normal. After that, pouring is performed on the mold M on which the core is set by the pouring machine 4. Note that a plurality of flasks F (in FIG. 1, 19 flasks) is transported by the transport device 5, and one flask F is stopped at each position. After ending the processes in the molding area (the position P1), the inspection area (the position P5), and the pouring area (the position P18), the line controller 6 controls the transport device 5 such that the flasks F (the molds M) are moved to the subsequent position. Thus, the molding process S01 for one flask F, the inspection process S03 for another flask F, the core setting process S05 for still another flask F, and the pouring process S07 for yet another flask F are performed in parallel with each other.

Figure 7:
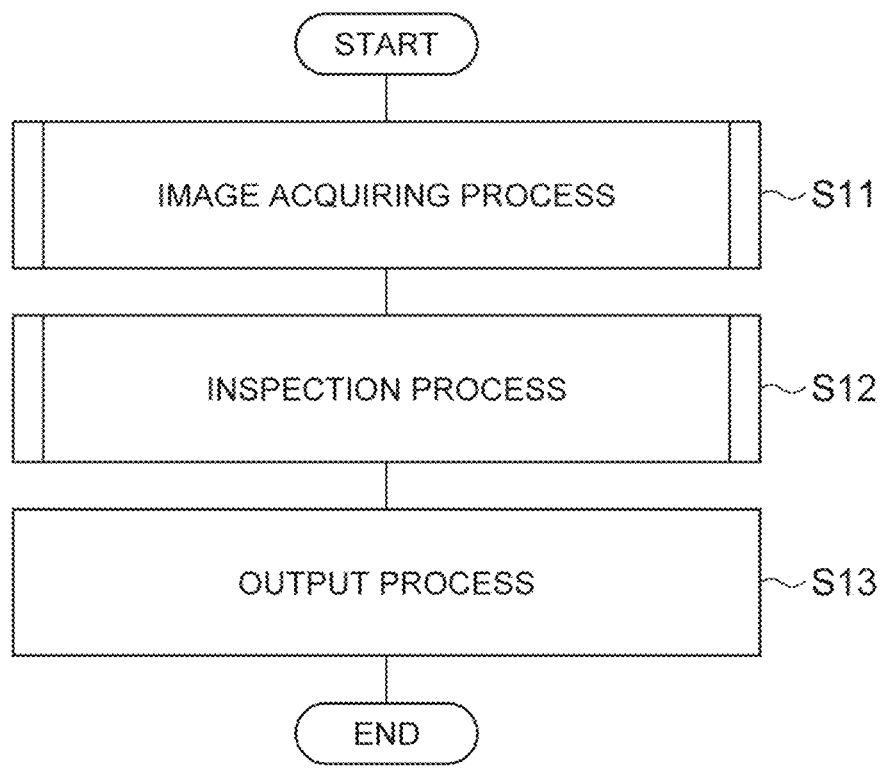
FIG. 7 is a flowchart showing a series of processes conducted by the controller of the inspection device in an inspection process shown in FIG. 6.
Figure 8:
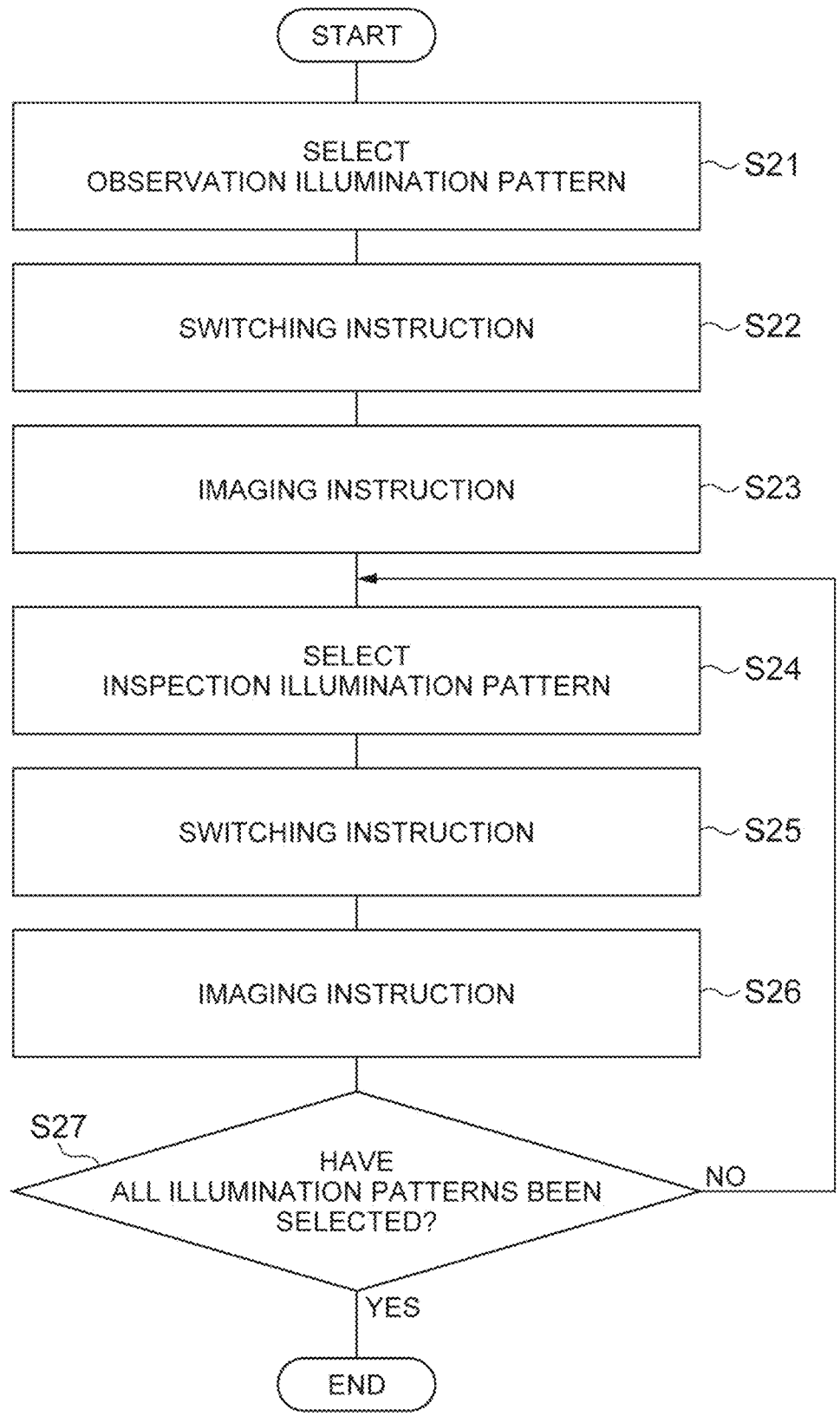
FIG. 8 is a flowchart showing the detail of an image acquiring process shown in FIG. 7.
Figure 9:
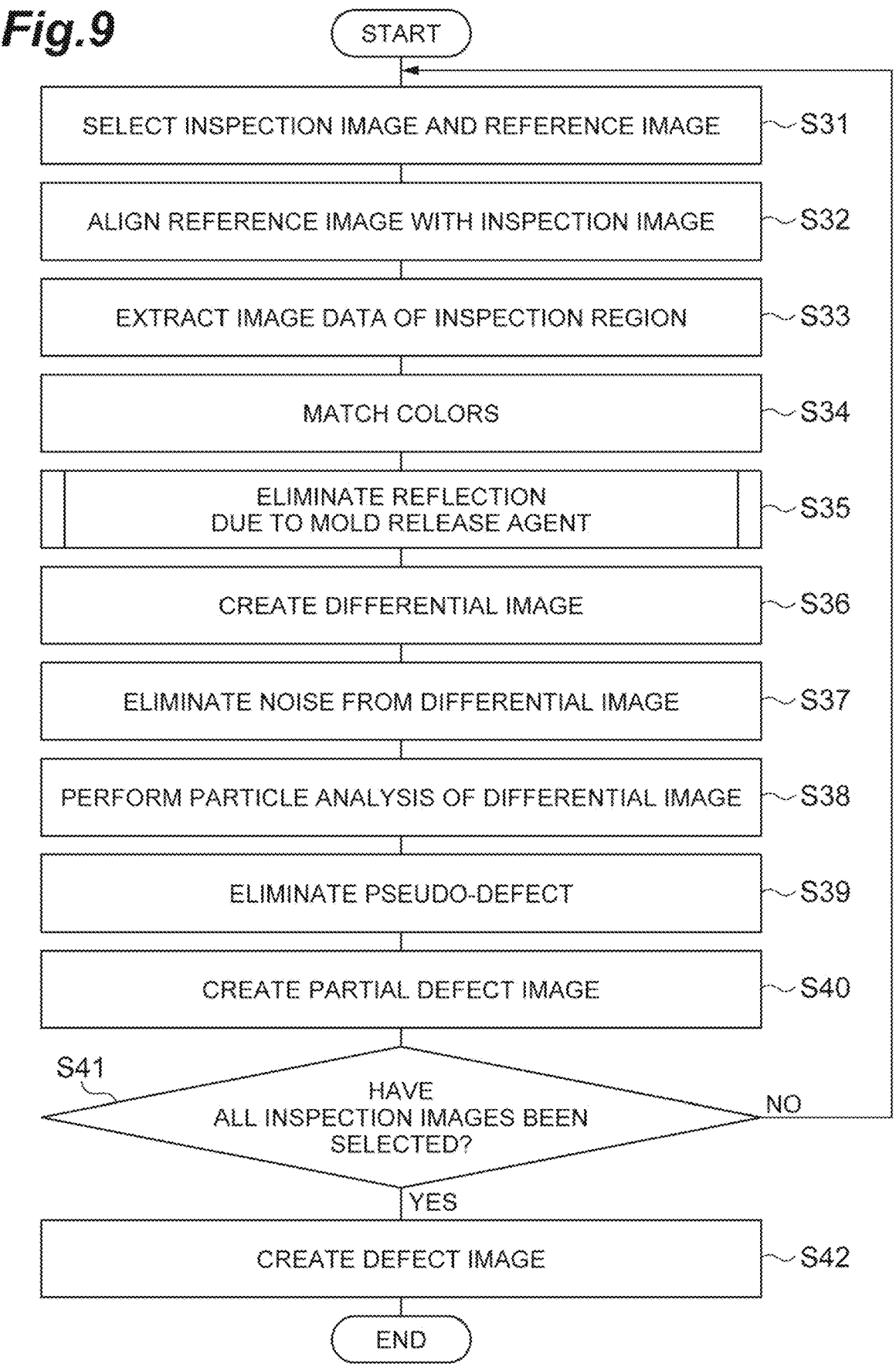
FIG. 9 is a flowchart showing the detail of the inspection process shown in FIG. 7.
Figure 10:
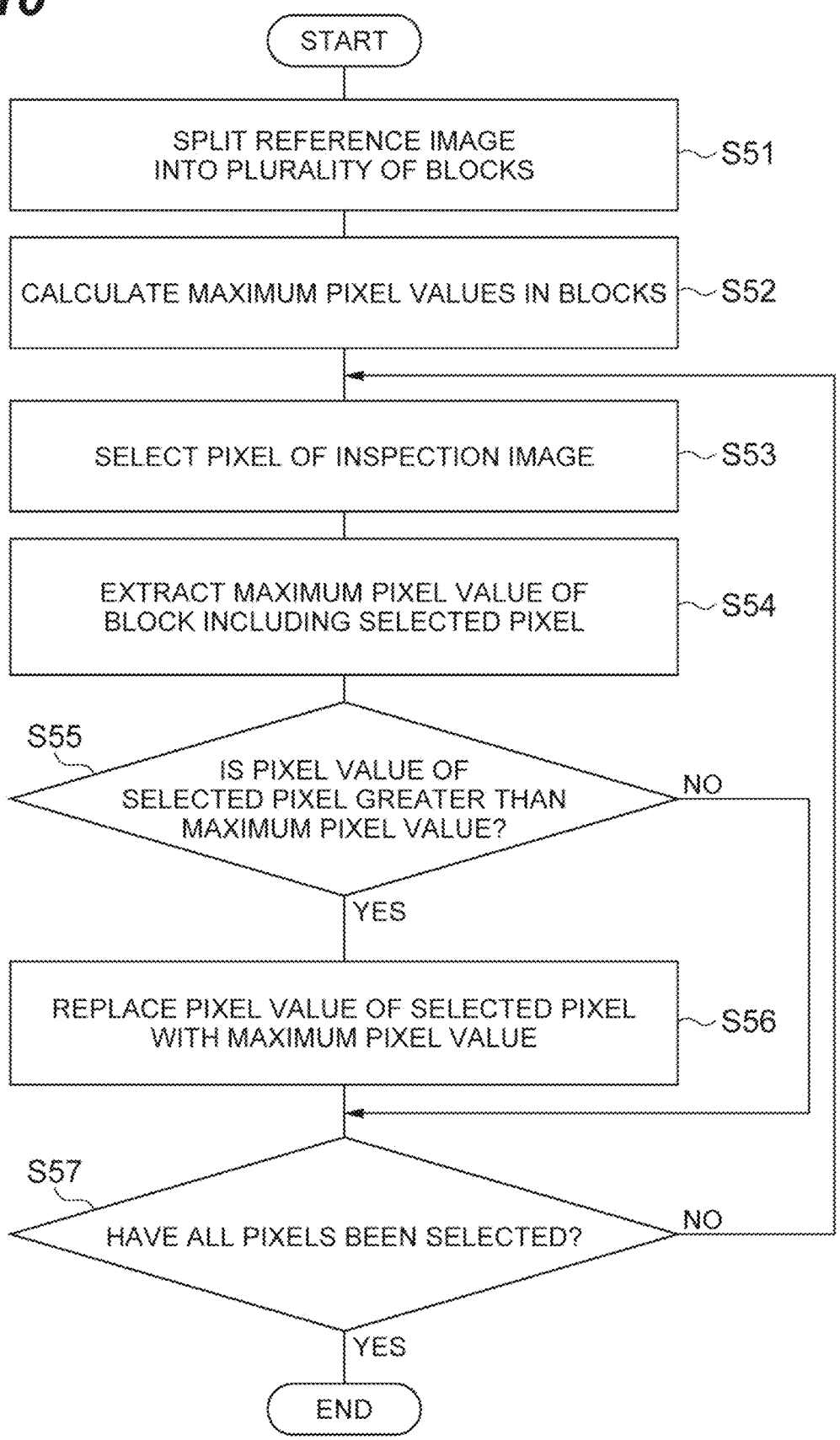
FIG. 10 is a flowchart showing the detail of an elimination process for eliminating reflection due to a mold release agent shown in FIG. 9.
Figure 11:
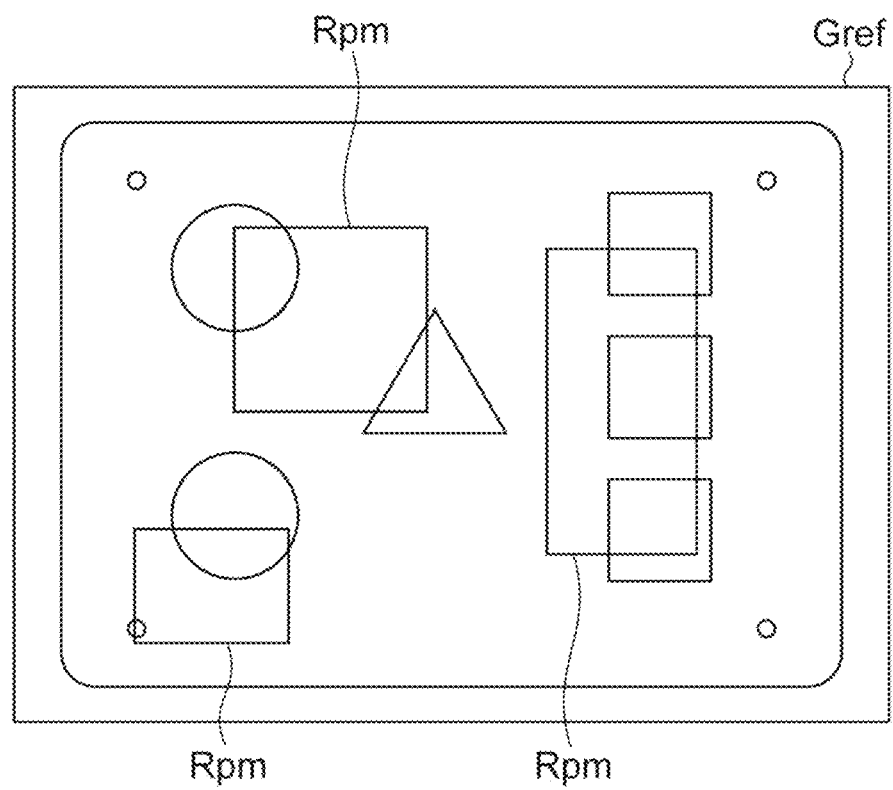
FIG. 11 is a diagram of an exemplary pattern matching model.
Figure 12:
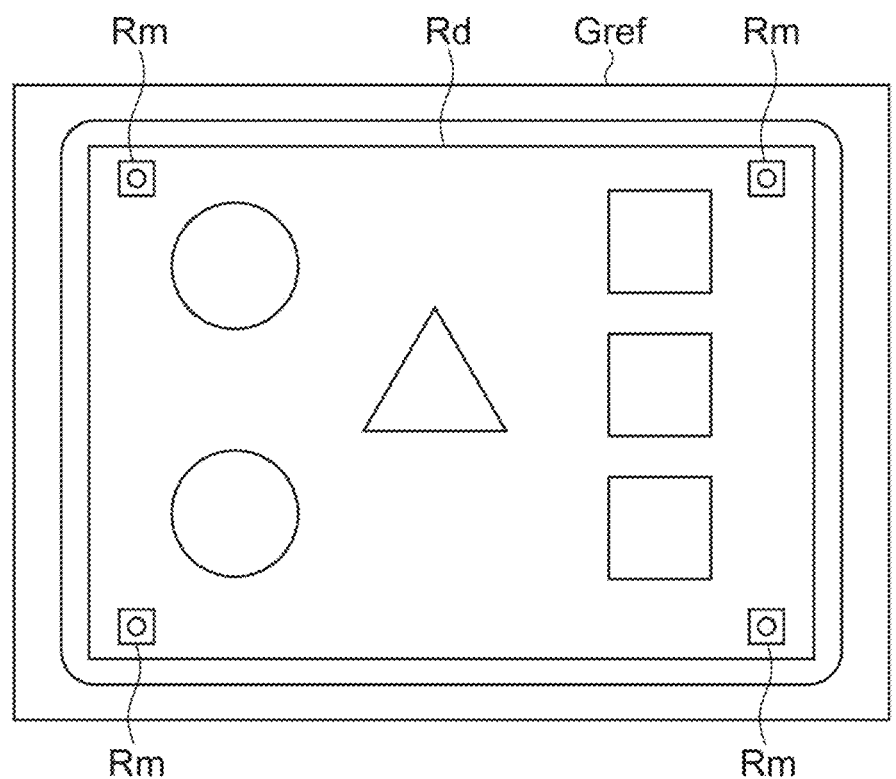
FIG. 12 is a diagram of an exemplary inspection region and an exemplary mask region.
Figure 13:
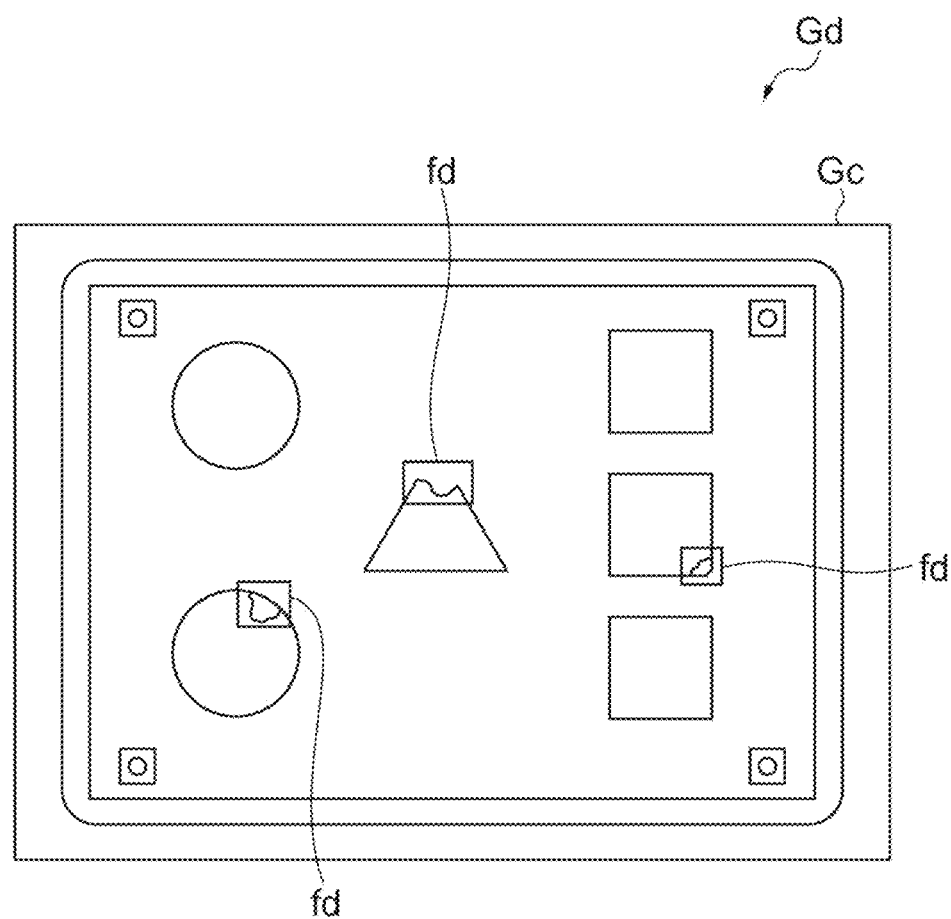
FIG. 13 is a diagram of an exemplary display image.

Next, referring to FIGS. 7 to 13, the inspection process S03 will be described in detail. FIG. 7 is a flowchart showing a series of processes conducted by the controller of the inspection device in the inspection process shown in FIG. 6. FIG. 8 is a flowchart showing the detail of an image acquiring process shown in FIG. 7. FIG. 9 is a flowchart showing the detail of an inspection process shown in FIG. 7. FIG. 10 is a flowchart showing the detail of an elimination process for eliminating reflection due to a mold release agent shown in FIG. 9. FIG. 11 is a diagram of an exemplary pattern matching model. FIG. 12 is a diagram of an exemplary inspection region and an exemplary mask region. FIG. 13 is a diagram of an exemplary display image.

As shown in FIG. 7, in the inspection process S03, first, the controller 34 performs the image acquiring process using the imaging device 31 (step S11). In the image acquiring process in step S11, the controller 34 causes the imaging device 31 to image the mold M to which light is applied in the observation illumination pattern, and acquires an observation image. The controller 34 causes the imaging device 31 to image the mold M to which light is applied in a plurality of inspection illumination patterns, and acquires inspection images.

Specifically, as shown in FIG. 8, first, the controller 34 selects an observation illumination pattern (step S21). The controller 34 outputs a switching instruction to the switch 36 such that the lighting device (the lighting devices 35a to 35f) corresponding to the selected illumination pattern is turned on, and the other lighting devices (the lighting devices 35g to 35j) are turned off (step S22). Thus, light is applied to the mold M in the observation illumination pattern. The controller 34 outputs an imaging instruction to the imaging device 31 (step S23). Upon the reception of the imaging instruction from the controller 34, the imaging device 31 images the mold M, and acquires an observation image. The imaging device 31 outputs the acquired observation image to the controller 34. In the observation illumination pattern, light is uniformly applied to the entire surface of the mold M, and hence the observation image is the image of the mold M having a natural appearance.

Subsequently, the controller 34 selects one illumination pattern from a plurality of preset inspection illumination patterns (step S24). The order of selecting the inspection illumination pattern is any option, or the order may be preset. The controller 34 outputs the switching instruction to the switch 36 such that the lighting device corresponding to the selected illumination pattern is turned on, and the other lighting devices are turned off (step S25). Thus, light is applied to the mold M in the selected illumination pattern. The lighting devices 35c to 35j are provided on the edges of the imaging space V, and hence the light is obliquely applied to the surface of the mold M. Thus, shadows corresponding to irregular shapes on the surface of the mold M are produced. The controller 34 outputs an imaging instruction to the imaging device 31 (step S26). Upon the reception of the imaging instruction from the controller 34, the imaging device 31 images the mold M, and acquires an inspection image. The imaging device 31 outputs the acquired inspection image to the controller 34.

The controller 34 determines whether all the illumination patterns have been selected (step S27). In the case in which the controller 34 determines that not all of the illumination patterns have been selected (step S27, NO), the process is returned to step S24. The controller 34 selects the subsequent illumination pattern from unselected illumination patterns (step S24), and repeats the processes in step S25 to step S27. On the other hand, in step S27, in the case in which the controller 34 determines that all the illumination patterns have been selected (step S27, YES), the controller 34 ends the image acquiring process.

Subsequently, the controller 34 performs an inspection process (step S12). In the inspection process in step S12, the controller 34 inspects the appearance of the mold M based on the inspection image and a reference image provided in advance. The reference image is an image obtained by imaging a normal mold M by the imaging device 31. As pre-processing of the inspection process, an reference image is registered, and inspection parameters are set. The inspection parameters may be set and changed by the operator of the casting system 1. Examples of the inspection parameters include a pattern matching model, an inspection region, a mask region, a color adjustment region, a minimum defect size, and a binarization threshold.

The pattern matching model is an image region used for the alignment of the reference image with the inspection image. As shown in FIG. 11, a pattern matching model Rpm is registered based on a reference image Gref. The pattern matching model Rpm is set as a rectangular region, for example.

The inspection region is an image region that is an inspection target in an image region included in the reference image and the inspection image. The regions other than the inspection region are not the inspection target of the inspection device 3. As shown in FIG. 12, an inspection region Rd is set to the reference image Gref. The inspection region Rd is set as a rectangular region, for example. The mask region is a region that is not the inspection target in the inspection region. As shown in FIG. 12, a mask region Rm is set within the range of the inspection region Rd. The mask region Rm is set as a rectangular region, for example.

The color adjustment region is an image region used for the comparison of colors between the reference image and the inspection image. The color adjustment region is set to the reference image similarly to the pattern matching model. The minimum defect size is the minimum size that is regarded as a defect. For example, the minimum defect size may be set as an actual size (10 mm×10 mm, for example) or may be set at the number of pixels. The binarization threshold is used in binarization of the differences between the reference image and the inspection image.

As shown in FIG. 9, in the inspection process in step S12, first, the controller 34 selects one inspection image (a first inspection image) from a plurality of inspection images acquired in the image acquiring process in step S11, and selects a reference image (a first reference image) to the inspection image (step S31). Specifically, the controller 34 selects the reference image of the normal mold M to which light is applied in the same illumination pattern as the illumination pattern in imaging the selected inspection image.

Note that the reference image of the mold M is in advance registered in the controller 34 for the individual types of the molds M. The reference image of the mold M is in advance registered in the controller 34 for the individual illumination patterns. A plurality of reference images may be registered for one illumination pattern. In this case, the controller 34 selects a reference image having the closest color to the inspection image from the plurality of reference images. For example, the controller 34 calculates the root-sum-square value of the difference between the pixel values of the pixels to the inspection image and each of the reference images on the color adjustment region that is in advance registered, and sets the calculated result to an error. The controller 34 selects a reference image having the smallest error from the plurality of reference images.

The controller 34 aligns the reference image with the inspection image (step S32). The position of the mold M in the reference image is sometimes displaced from the position of the mold M in the inspection image due to the size of the flask F caused by a production tolerance, for example, and transport accuracy of the flask F by the transport device 5, for example. Thus, the controller 34 calculates the displacement amount of the reference image from the inspection image based on pattern matching using a preset pattern matching model (the image region), for example. The controller 34 aligns the reference image with the inspection image based on the displacement amount. For example, the controller 34 performs alignment by shifting the inspection image such that the displacement amount is zero.

The controller 34 extracts the image of the preset inspection region (in the following, simply referred to as a "reference image") from the aligned reference image, and extracts the image of the inspection region (in the following, simply referred to as an "inspection image") from the aligned inspection image (step S33). The image of the mask region is not used in the processes below, and hence the controller 34 does not necessarily have to extract the image of the mask region in the inspection region.

The controller 34 matches the colors of the reference image and the inspection image (step S34). Specifically, the controller 34 calculates the correction factor of the inspection image such that the difference between the sum of the pixel values of all the pixels included in the reference image and the sum of the pixel values of all the pixels included in the inspection image is small. For example, the controller 34 calculates a correction factor with which the root-sum-square value of the difference (the error) between the pixel values of the pixels included in the reference image and the pixel values of the pixels included in the inspection image corresponding to the pixels is minimum. The controller 34 multiples each of the pixel values of all the pixels included in the inspection image by the correction factor, and hence matches the color of the inspection image with the color of the reference image.

The controller 34 eliminates reflection due to the mold release agent from the inspection image (step S35). As shown in FIG. 10, in step S35, first, the controller 34 splits the reference image into a plurality of blocks (step S51). The size of the blocks is preset. The controller 34 calculates the maximum pixel value of the pixel values of the pixels included in the block on each of the plurality of blocks (step S52).

The controller 34 selects one pixel from the pixels included in the inspection image (step S53). The controller 34 extracts the maximum pixel value of the block including the pixel of the reference image corresponding to the selected pixel (step S54). The controller 34 compares the pixel value of the selected pixel with the extracted maximum pixel value, and determines whether the pixel value of the selected pixel is greater than the extracted maximum pixel value (step S55). In the case in which the controller 34 determines that the pixel value of the selected pixel is greater than the extracted maximum pixel value (step S55, YES), the controller 34 determines that reflection due to the mold release agent occurs, and replaces the pixel value of the selected pixel with the maximum pixel value (step S56). Thus, reflection is eliminated from the pixel. On the other hand, in the case in which the controller 34 determines that the pixel value of the selected pixel is the extracted maximum pixel value or less (step S55, NO), the controller 34 determines that no reflection due to the mold release agent occurs, and maintains the pixel value of the selected pixel as it is.

The controller 34 determines whether all the pixels have been selected (step S57). In the case in which the controller 34 determines that not all of the pixels have been selected (step S57, NO), the process is returned to step S53. The controller 34 selects the subsequent pixel from unselected pixels (step S53), and repeats the processes in step S54 to step S57. On the other hand, in step S57, in the case in which the controller 34 determines that all the pixels have been selected (step S57, YES), the controller 34 ends the eliminating process for eliminating reflection due to the mold release agent.

The controller 34 creates a differential image (a first differential image) based on the reference image and the inspection image (step S36). Specifically, the controller 34 calculates the difference between the pixel value of each of the pixels included in the reference image and the pixel value of the pixel of the inspection image corresponding to the pixel. The controller 34 sets the value to zero (black) in the case in which the difference is greater than the binarization threshold, whereas the controller 34 sets the value to one (white) in the case in which the difference is the binarization threshold or less. As such, the controller 34 creates a differential image. That is, the differential image is a binarization image. The controller 34 may create a differential image by respectively subtracting the pixel values of the inspection image from the pixel values of the reference image, may create a differential image by respectively subtracting the pixel values of the reference image from the pixel values of the inspection image, or may create both of differential images.

The controller 34 eliminates noise from the differential image (step S37). The controller 34 eliminates noise from the differential image using a filter, for example. The controller 34 performs particle analysis of the differential image (step S38). The controller 34 calculates the feature values of a cluster (a blob), such as the position, the area, and the length, in differential image by particle analysis. At this time, the controller 34 determines whether each cluster is a defect based on the minimum defect size. The controller 34 eliminates a cluster determined as no defect from the differential image, and hence detects the remaining clusters as defects. The controller 34 determines that a cluster smaller than 0.5 times the minimum defect size, for example, is not a defect.

The controller 34 identifies a pseud-defect (step S39). The controller 34 identifies a pseud-defect from clusters included in the differential image based on the colors of clusters (defects), for example. In the case in which a chip occurs on the mold M, the chip makes a shadow on the inspection image. In this case, the image region of the inspection image corresponding to the cluster is darker than the surroundings. Thus, the controller 34 compares the color of the image region of the inspection image corresponding to the cluster with the color of the surroundings, and hence determines whether the cluster is a pseud-defect. In the case in which the color of the image region is equivalent to the color of the surrounding or brighter than the color of the surrounding, the controller 34 identifies the cluster as a pseud-defect.

The controller 34 may identify a pseud-defect from clusters included in the differential image based on the contour shapes of the clusters (the defects). When light is reflected by a certain part of the mold M, that part is sometimes wrongly detected as a defect. In this case, the contour shape of that part is not changed, and hence the controller 34 determines whether the part is a pseud-defect by the comparison of the contour shape on the reference image with the contour shape on the inspection image. Specifically, in the case in which the contour shape of the image region of the reference image corresponding to the cluster is the same as the contour shape of the image region of the inspection image corresponding to the cluster, the controller 34 identifies the cluster as a pseud-defect.

The controller 34 creates a partial defect image (step S40). The partial defect image is an image that indicates the defect of the mold M detected in one illumination pattern. Specifically, the controller 34 eliminates the pseud-defect identified in step S39 from the differential image, and hence creates a partial defect image. The controller 34 determines whether all the inspection images have been selected (step S41). In the case in which the controller 34 determines that not all of the inspection images have been selected (step S41, NO), the process is returned to step S31. The controller 34 selects the subsequent inspection image (the second inspection image) from the unselected inspection images, selects a reference image (the second reference image) for the inspection image (step S31), and repeats the processes in step S32 to step S41.

On the other hand, in step S41, in the case in which the controller 34 determines that all the inspection images have been selected (step S41, YES), the controller 34 creates a defect image (step S42). The defect image is an image that indicates the defect of the mold M detected by the inspection device 3. Specifically, the controller 34 combines the partial defect images (the first partial defect image and the second partial defect image) obtained from the inspection images, and hence creates a defect image. That is, the controller 34 creates the image having all the defects included in the partial defect images as a defect image.

Subsequently, the controller 34 performs an output process (step S13). In the output process in step S13, first, the controller 34 creates an inspection result based on the defect image. For example, in the case in which no defect is included in the defect image, the controller 34 determines that the mold M is normal, whereas in the case in which a defect is included in the defect image, the controller 34 determines that the mold M is abnormal. The controller 34 outputs an inspection result indicating whether the mold M is normal or abnormal to the line controller 6. The line controller 6 stores the inspection result on the mold management table. The controller 34 may create a display image that is displayed for the operator based on the observation image acquired in step S11 and the defect image created in step S12. As shown in FIG. 13, the controller 34 may create a display image Gd by surrounding the image region corresponding to the defect included in the defect image by a rectangular frame fd on an observation image Gc. This display image Gd may be displayed on the monitor of the control panel 33 in the core setting process S05. Note that the generation of the inspection result and the creation of the display image may be performed in the inspection process in step S12.

As described above, in the inspection process S03, the mold M to which light is applied in the plurality of inspection illumination patterns is imaged from above along the Z-axis direction, hence the inspection image is acquired, and the appearance of the mold M is inspected based on the inspection image and the reference image. Since the lighting devices 35c to 35j are provided on the edges of the imaging space V, in the case in which light is applied to the mold M in the inspection illumination pattern, the light is obliquely applied to the surface of the mold M. Thus, shadows corresponding to irregular shapes on the surface of the mold M are produced. That is, with the comparison of the reference image with the inspection image, the shadow obtained by applying light to the normal mold M is compared with the shadow obtained by applying light to the mold M that is an inspection target. Thus, the inspection device 3 detects defects, such as cracks, chips, and unnecessary projections (burrs) on the surface of the mold M. As described above, according to the inspection device 3, the three-dimensional shape of the mold M can be confirmed by a two-dimensional image. Specifically, even in the case in which the color of the mold M is black, the cavity part and the parting surface of the mold M can be identified.

Next, referring to FIG. 14 and FIG. 15(a) to FIG. 15(c), the operation and effect of the casting system 1 and the inspection device 3 will be described. FIG. 14 is a diagram showing the differences in illumination ranges between the upper illumination pattern and the middle illumination pattern. FIG. 15(a) is a diagram showing the differences in defect detection between the upper illumination pattern and the middle illumination pattern. FIG. 15(b) is a plan view of the mold to which light is applied in an upper illumination pattern. FIG. 15(c) is a plan view of the mold to which light is applied in a middle illumination pattern.

In the casting system 1 and the inspection device 3, the mold M to which light is applied in the inspection illumination patterns is imaged by the imaging device 31 from above along the Z-axis direction, and hence inspection images are acquired. The inspection illumination pattern includes the upper illumination pattern and the middle illumination pattern. For example, as shown in FIG. 14, light Lu of the upper illumination pattern (that is a "first illumination pattern") obtained by turning on the lighting device 35d (a first lighting device) is applied to the mold M from the rear end of the imaging space V on the plane VP1. Light Lm of the middle illumination pattern (that is a "second illumination pattern") obtained by turning on the lighting device 35h (a second lighting device) is applied to the mold M from the rear end of the imaging space V on the plane VP2. Although the position (a first position) of the lighting device 35d is different from the position (a second position) of the lighting device 35h, the positions overlap each other when viewed from the Z-axis direction. That is, in the first illumination pattern and the second illumination pattern, light is applied to the mold M from the same direction (the X-axis direction) when viewed from in the Z-axis direction, but the light incident angle relative to the mold M in the first illumination pattern is different from the light incident angle relative to the mold M in the second illumination pattern.

In the case in which a recess 51a is provided on a surface (a top face) 51 of the mold M, the incident angle of the light Lm relative to the surface 51 of the mold M is greater than the incident angle of the light Lu, and the light Lm is hardly applied to a bottom face 51b of the recess 51a. Thus, in the inspection image obtained by imaging the mold M to which the light Lm is applied, a shadow is formed on the bottom face 51b, and hence the inspection of the bottom face 51b fails. On the other hand, the incident angle of the light Lu relative to the surface 51 of the mold M is smaller than the incident angle of the light Lm, and hence the light Lu is applied to the bottom face 51b of the recess 51a. Thus, in the inspection image obtained by imaging the mold M to which the light Lu is applied, the area of a shadow formed on the bottom face 51b is small, and hence the bottom face 51b can be inspected. As described above, with the use of two lighting devices provided at different positions (heights) in the Z-axis direction, the part to which no light is applied can be reduced on the surface 51 of the mold M. Thus, the inspection range can be increased.

As shown in FIGS. 15(a) and 15(b), in the case in which a chip 52 occurs on the surface of the mold M, the incident angle of the light Lu relative to the surface of the mold M is smaller than the incident angle of the light Lm, and hence a shadow 52a obtained by applying the light Lu to the chip 52 is small. Thus, in the inspection image obtained by imaging the mold M to which the light Lu is applied, the chip 52 might not be detected as a defect. On the other hand, as shown in FIGS. 15(a) and 15(c), the incident angle of the light Lm relative to the surface of the mold M is greater than the incident angle of the light Lu, and hence a shadow 52b obtained by applying the light Lm to the chip 52 is greater than the shadow 52a. Thus, in the inspection image obtained by imaging the mold M to which the light Lm is applied, the chip 52 can be detected as a defect. As described above, in the case in which the mold M has defects, such as cracks, chips, and unnecessary projections (burrs), the application of light at different incident angles can increase the size of the shadow of the defect to the extent that the shadow can be determined as a defect. Thus, the detection accuracy of defects can be improved. From the description above, the inspection accuracy of the mold M can be improved.

The illuminating unit 32 applies light to the mold M from four directions, i.e., the front end, the rear end, the left end, and the right end of the imaging space V on the plane VP1 using four upper illumination patterns (the first illumination pattern and a third illumination pattern). The controller 34 causes the imaging device 31 to image the mold M to which light is applied in the individual upper illumination patterns, and hence acquires the inspection images (the first inspection image and the third inspection image). The illuminating unit 32 applies light to the mold M from four directions, i.e., the front end, the rear end, the left end, and the right end of the imaging space V on the plane VP2 using four middle illumination patterns (the second illumination pattern and a fourth illumination pattern). The controller 34 causes the imaging device 31 to image the mold M to which light is applied in the individual middle illumination patterns, and hence acquires the inspection images (the second inspection image and the fourth inspection image). As described above, although the position of the lighting device 35d is different from the position of the lighting device 35h, the positions overlap each other when viewed from the Z-axis direction. Similarly, although the position (a third position) of the lighting device 35c (a third lighting device) is different from the position (a fourth position) of the lighting device 35g (a fourth lighting device), the position of the lighting device 35e is different from the position of the lighting device 35i, and the position of the lighting device 35f is different from the position of the lighting device 35j, the positions overlap each other when viewed from the Z-axis direction. As described above, light is applied to the mold M from the positions (the heights) different in the Z-axis direction in four directions viewed from the Z-axis direction. Thus, the inspection range can be increased and the detection accuracy of defects can be improved. As a result, the inspection accuracy of the mold M can be further improved.

The shadows produced on the mold M and the luminance distribution on the surface of the mold M, for example, sometimes vary depending on the light illumination direction to the mold M and the light incident angle relative to the mold M, for example. When inspection is performed using the reference image of the normal mold M to which light is applied in the illumination pattern different from the illumination pattern in imaging the inspection image, there is an increase in a possibility of wrongly detecting a part that is not originally a defect as a defect. In the casting system 1 and the inspection device 3, the inspection image is compared with the reference image of the normal mold M to which light is applied in the same illumination pattern as the illumination pattern in imaging the inspection image. Thus, the possibility that a defect is wrongly detected can be reduced. As a result, the inspection accuracy of a target can be further improved.

With the comparison of the inspection image with the reference image corresponding to the inspection image, the partial defect image is created, and with the combination of the partial defects image obtained from the inspection images, the defect image is created. The defect image has all the defects included in the partial defect images, and hence the defect image including defects that fail to be detected in the individual illumination patterns is obtained.

Only by turning on any one of the lighting devices 35c to 35j and turning off the other lighting devices, inspection illumination patterns are obtained. As described above, control and structures that generate illumination patterns can be made simple.

The imaging device 31 is provided at the center of the ceiling part of the housing 30, and images the mold M from above. Thus, one imaging device 31 can image the entire surfaces of the mold M. A plurality of imaging devices 31 may be provided. In this case, the pixel resolution of each of the imaging devices 31 is enhanced, and hence smaller defects can be detected.

In the case in which a plurality of reference images is registered to one illumination pattern, the controller 34 selects a reference image having a color closest to the inspection image from the plurality of reference images. The colors of captured images sometimes vary due to the state of the mold M even though the same mold M is imaged, the state of the illuminating unit 32 (the lighting devices 35c to 35j), and the state of the imaging device 31, for example. When inspection is performed using a reference image having a color different from the inspection image, there is an increase in a possibility of wrongly detecting a part that is not originally a defect as a defect. In the casting system 1 and the inspection device 3, the reference image having a color closest to the inspection image is used, and hence the possibility that a defect is wrongly detected can be reduced. As a result, the inspection accuracy of the mold M can be further improved.

The inspection device 3 includes the housing 30 that accommodates the imaging device 31 and the illuminating unit 32. The illuminating unit 32 applies light to the mold M disposed in the housing 30. Thus, a possibility that light from a light source different from the illuminating unit 32 (the lighting devices 35a to 35j) is applied to the mold M can be reduced. Thus, since the influence of the external environment on inspection can be reduced, the inspection accuracy of the mold M can be further improved.

In producing the mold M, a mold release agent is sometimes used. When a mold release agent remains on the surface of the mold M, there is a possibility that light is reflected by the mold release agent. The luminance (the pixel value) of the part of the mold M where the mold release agent remains is sometimes increased in the inspection image due to the influence of this reflection. Thus, there is a possibility that this part is detected as a defect. On the other hand, the controller 34 eliminates reflection due to the mold release agent from the inspection image, and inspects the appearance of the mold M based on the inspection image from which the reflection is eliminated and the reference image, and hence wrong detection of a defect can be reduced.

As described above, in the case in which the reflection of light occurs on the surface of the mold M, there is a possibility that this part is detected as a defect. The controller 34 determines whether reflection occurs based on the feature values of that part, such as the color and the contour shape, in the inspection image, and eliminates the part where reflection occurs as a psued-defect from the differential image. Thus, the wrong detection of a defect can be reduced.

The line controller 6 controls the pouring machine 4 so as not to pour a molten metal into the mold M showing that the inspection result is abnormal. Even though a molten metal is poured into the mold M having a defect, a cast having the defect is produced. Thus, no molten metal is poured into the mold M showing that the inspection result is abnormal, hence the defective rate of casts can be reduced, and the production efficiency of casts can be improved.

The monitor of the control panel 33 displays the inspection result. Thus, the inspection result of the mold M can be recognized to the operator stationed at the core setting site W. Therefore, the operator can perform a task suitable for the inspection result. For example, the operator can perform tasks such that the operator sets a core on a mold M showing that the inspection result is normal, and sets no core on a mold M showing that the inspection result is abnormal. The operator only has to confirm the inspection result displayed on the monitor, and does not have to visually confirm the defect of the mold M. Thus, the operator can focus attention on the task to set a core.

Note that the inspection device and the casting system according to the present disclosure are not limited to the embodiment.

For example, the target for the inspection of the appearance by the inspection device 3 is not limited to the mold M. The target may be a cast and the molding pattern (on a mold).

The casting system 1 does not necessarily have to include the molding machine 2. In this case, the transport device 5 transports a mold M produced by an external molding machine to the pouring machine 4 through the inspection device 3. The casting system 1 does not necessarily have to include the pouring machine 4. In this case, the transport device 5 transports the mold M inspected by the inspection device 3 to an external pouring machine.

The illuminating unit 32 does not necessarily have to include a plurality of lighting devices. For example, the illuminating unit 32 may include a mechanism that can move one lighting device in which the lighting device is moved to apply light to the mold M in the illumination patterns. In this case, the number of the lighting devices can be reduced, and the switch 36 is unnecessary. The illuminating unit 32 does not necessarily have to apply light in the observation illumination pattern, and does not necessarily have to include the observation lighting device.

The illuminating unit 32 may further apply light in illumination patterns at one or more different heights in addition to the upper illumination pattern and the middle illumination pattern. For example, the illuminating unit 32 may further include a lighting device disposed on a virtual plane that intersects with (orthogonal to) the Z-axis in the direction different from the plane VP1 and the plane VP2. In this case, the part to which no light is applied can be further reduced on the surface of the mold M. Thus, the inspection range can be further increased.

The number of the lighting devices provided on each of the planes is not limited to four. The number of the lighting devices on each of the planes is increased, and hence the detection accuracy of defects can be further improved. The number of planes intersecting with the Z-axis direction on which the lighting devices are provided may be two or more, and the number of the lighting devices provided on each of the planes may be one or more. For example, the illuminating unit 32 may include any one set, two sets, or three sets of a set of the lighting device 35c and the lighting device 35g, a set of the lighting device 35d and the lighting device 35h, a set of the lighting device 35e and the lighting device 35i, and a set of the lighting device 35f and the lighting device 35j.

Figure 16:
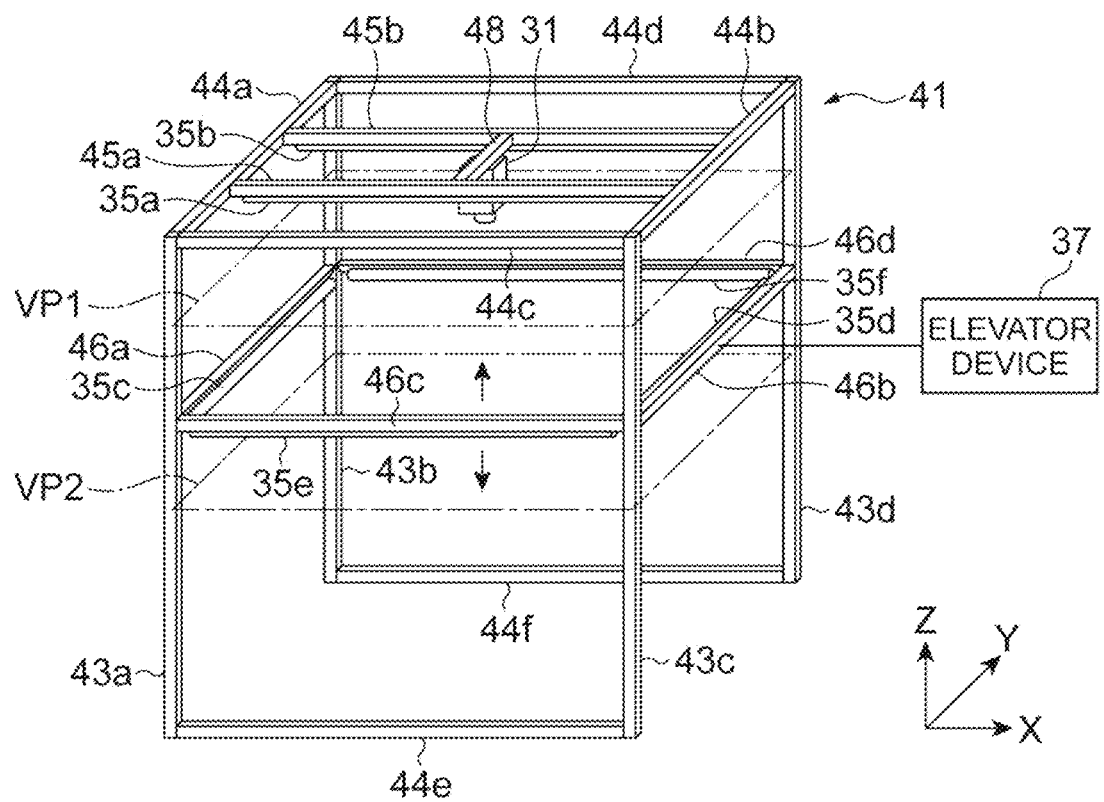
FIG. 16 is a view showing an exemplary modification of the illuminating unit.

As shown in FIG. 16, the illuminating unit 32 may include an elevator device 37 instead of the lighting devices 35g to 35j. The elevator device 37 is a device that carries the lighting devices 35c to 35f up and down along the Z-axis direction. In this case, the housing 30 does not necessarily have to include the mounting members 47a to 47d. The mounting members 46a to 46d are moveably installed on the pillar members 43a to 43d along the Z-axis direction. That is, the elevator device 37 moves the mounting members 46a to 46d along the Z-axis direction, and hence carries the lighting devices 35c to 35f up and down. Note that in FIG. 16, for convenience, although the elevator device 37 is connected to the mounting member 46b, the elevator device 37 is also connected to the mounting members 46a, 46c, and 46d.

Upon the reception of an elevating instruction from the controller 34, the elevator device 37 carries the lighting devices 35c to 35f up and down. For example, in the case in which light is applied in the upper illumination pattern, the elevator device 37 adjusts the heights of the lighting devices 35c to 35f such that the lighting devices 35c to 35f are disposed on the plane VP1. In the case in which light is applied in the middle illumination pattern, the elevator device 37 adjusts the heights of the lighting devices 35e to 35f such that the lighting devices 35c to 35f are disposed on the plane VP2. With this configuration, the number of the lighting devices can be reduced.

The elevator device 37 may adjust the heights of the lighting devices 35c to 35f such that the lighting devices 35c to 35f are disposed on a virtual plane different from the plane VP1 and the plane VP2, and intersecting with (orthogonal to) the Z-axis direction. The lighting devices 35c to 35f are carried up and down, and hence the illumination patterns at various heights can be generated with no increase in the number of the lighting devices.

When the operator confirms a mold M showing that the inspection result by the inspection device 3 is abnormal, in some case, the mold M is actually normal, and the defect detected by the inspection device 3 is a pseud-defect. In this case, a configuration may be provided in which the operator manipulates the control panel 33 to additionally register the inspection image of the mold M that is determined as abnormal as a reference image. Thus, similar wrong detection can be suppressed, and hence the inspection accuracy can be further improved.

The line controller 6 may store mold information on the mold management table such that the pieces of mold information on the molds M is further associated with at least any one of the molding conditions of the mold M and the sand properties in molding the mold M. Examples of the molding conditions include an aeration pressure, a squeeze pressure, and the spray time of a mold release agent. Examples of the sand properties include a compactability (CB) value and a moisture percentage value. A configuration may be provided in which the line controller 6 analyzes a plurality of pieces of mold information on the molds M accumulated on the mold management table and finds the correlation between the inspection result and the molding conditions. Machine learning such as decision tree analysis is used for the analysis of mold information, for example.

The line controller 6 may acquire the molding conditions having the correlation with the mold M showing that the inspection result is normal by analysis and may control the molding machine 2 such that molding is performed under the acquired molding conditions. Specifically, the line controller 6 sends a signal that specifies the molding conditions having the correlation with a normal inspection result to the molding machine 2. In this case, the production accuracy of the mold M can be improved. As a result, the production efficiency of casts can be improved.

The inspection device 3 may send the position of a defect of the mold M showing that the inspection result is abnormal to the line controller 6. The line controller 6 may subject the defect position to a statistical process for mold information analysis. The line controller 6 uses the processed result of the defect position for the abnormality of the mold M, and change in the coating position of a mold release agent, for example.

The line controller 6 may acquire the sand properties having the correlation with the mold M showing that the inspection result is normal by analysis and may control the molding machine 2 such that molding is performed under the acquired sand properties. Specifically, the line controller 6 sends a signal that specifies the sand properties having the correlation with a normal inspection result to the molding machine 2. In this case, the production accuracy of the mold M can be improved. As a result, the production efficiency of casts can be improved.

Note that as a result of analysis, findings are sometimes made that a plurality of molding conditions has the correlation with a normal inspection result. Similarly, findings are sometimes made that a plurality of sand properties has the correlation with a normal inspection result. In this case, the line controller 6 may send signals that specify the molding conditions and the sand properties having the highest correlation with a normal inspection result to the molding machine 2.

In the case in which a product (a cast) produced using a mold M showing that the inspection result by the inspection device 3 is normal is a failure, it is unnecessary to take into account of factors that occur in the molding process S01 in taking measures against failures. Therefore, measures against failures can be performed based on the assumption that a failure occurs after the molding process S01, and hence time necessary to take measures against failures can be more shortened than in previously existing techniques.

REFERENCE SIGNS LIST 1 casting system
2 molding machine
3 inspection device
4 pouring machine
5 transport device
6 line controller
30 housing
31 imaging device
32 illuminating unit
33 control panel
34 controller 35a to 35j lighting device
36 switch
37 elevator device
F flask
M mold (target)
V imaging space
VP1 plane (first plane)
VP2 plane (second plane)

The invention claimed is:

1. An inspection device configured to inspect an appearance of a target, the device comprising:
    an imaging device configured to image the target from a first direction;
    at least one lighting device configured to apply light to the target in a first illumination pattern in which light is applied to the target from a first position and in a second illumination pattern in which light is applied to the target from a second position different from the first position; and
    a controller configured to acquire a first inspection image by causing the imaging device to image the target to which light is applied in the first illumination pattern, the controller being configured to acquire a second inspection image by causing the imaging device to image the target to which light is applied in the second illumination pattern, the controller being configured to inspect an appearance of the target based on the first inspection image, the second inspection image, and a reference image provided in advance, wherein
    the first position and the second position overlap each other when viewed from the first direction.

2. The inspection device according to claim 1, wherein
the at least one lighting device includes
a first lighting device provided at the first position, and
a second lighting device provided at the second position.

3. The inspection device according to claim 2, wherein
the at least one lighting device further applies light to the target in a third illumination pattern in which light is applied to the target from a third position and in a fourth illumination pattern in which light is applied to the target from a fourth position different from the third position,
    the controller acquires a third inspection image by causing the imaging device to image the target to which light is applied in the third illumination pattern, the controller acquires a fourth inspection image by causing the imaging device to image the target to which light is applied in the fourth illumination pattern, and the controller inspects the appearance of the target further based on the third inspection image and the fourth inspection image,
    the third position and the fourth position overlap each other when viewed from the first direction,
    the first position and the third position are positions different from each other on a first plane intersecting with the first direction, and
    the second position and the fourth position are positions different from each other on a second plane intersecting with the first direction.

4. The inspection device according to claim 3, wherein
the at least one lighting device includes
a third lighting device provided at the third position, and
a fourth lighting device provided at the fourth position.

5. The inspection device according to claim 2, wherein
the controller creates a first partial defect image showing a defect of the target by comparing the first inspection image with a first reference image provided in advance for the first illumination pattern, the defect being detected in the first illumination pattern,
    the controller creates a second partial defect image showing a defect of the target by comparing the second inspection image with a second reference image provided in advance for the second illumination pattern, the defect being detected in the second illumination pattern, and
    the controller creates a defect image showing a defect of the target based on the first partial defect image and the second partial defect image.

6. The inspection device according to claim 1, further comprising:
    an elevator device configured to carry the at least one lighting device up and down along the first direction.

7. The inspection device according to claim 6, wherein
the at least one lighting device further applies light to the target in a third illumination pattern in which light is applied to the target from a third position and in a fourth illumination pattern in which light is applied to the target from a fourth position different from the third position,
    the controller acquires a third inspection image by causing the imaging device to image the target to which light is applied in the third illumination pattern, the controller acquires a fourth inspection image by causing the imaging device to image the target to which light is applied in the fourth illumination pattern, and the controller inspects the appearance of the target further based on the third inspection image and the fourth inspection image,
    the third position and the fourth position overlap each other when viewed from the first direction,
    the first position and the third position are positions different from each other on a first plane intersecting with the first direction, and
    the second position and the fourth position are positions different from each other on a second plane intersecting with the first direction.

8. The inspection device according to claim 7, wherein
the at least one lighting device includes
a first lighting device provided at the first position,
a second lighting device provided at the second position,
a third lighting device provided at the third position, and
a fourth lighting device provided at the fourth position.

9. The inspection device according to claim 1, wherein
the at least one lighting device further applies light to the target in a third illumination pattern in which light is applied to the target from a third position and in a fourth illumination pattern in which light is applied to the target from a fourth position different from the third position,
    the controller acquires a third inspection image by causing the imaging device to image the target to which light is applied in the third illumination pattern, the controller acquires a fourth inspection image by causing the imaging device to image the target to which light is applied in the fourth illumination pattern, and the controller inspects the appearance of the target further based on the third inspection image and the fourth inspection image,
    the third position and the fourth position overlap each other when viewed from the first direction,
    the first position and the third position are positions different from each other on a first plane intersecting with the first direction, and the second position and the fourth position are positions different from each other on a second plane intersecting with the first direction.

10. The inspection device according to claim 9, wherein the at least one lighting device includes
a first lighting device provided at the third position, and
a second lighting device provided at the fourth position.

11. The inspection device according to claim 1, wherein the controller creates a first partial defect image showing a defect of the target by comparing the first inspection image with a first reference image provided in advance for the first illumination pattern, the defect being detected in the first illumination pattern,
the controller creates a second partial defect image showing a defect of the target by comparing the second inspection image with a second reference image provided in advance for the second illumination pattern, the defect being detected in the second illumination pattern, and
the controller creates a defect image showing a defect of the target based on the first partial defect image and the second partial defect image.

12. The inspection device according to claim 11, wherein the controller selects, as the first reference image, an image having a color closest to a color of the first inspection image from a plurality of images provided in advance.

13. The inspection device according to claim 11, wherein the controller generates a first differential image based on the first reference image and the first inspection image,
the controller identifies a pseud-defect in defects obtained by analysis of the first differential image based on a feature value of an image region included in the first inspection image corresponding to the defect, and
the controller eliminates the pseud-defect from the first differential image to create the first partial defect image.

14. The inspection device according to claim 1, further comprising a housing configured to accommodate the imaging device and the at least one lighting device, wherein the at least one lighting device applies light to the target disposed in the housing.

15. The inspection device according to claim 1, wherein the target is a mold, and
the controller eliminates reflection due to a mold release agent from the inspection image, and the controller inspects an appearance of the mold based on the inspection image from which the reflection is eliminated and the reference image.

16. A casting system configured to produce a cast, the system comprising:
the inspection device according to claim 1;
a transport device configured to transport a mold from a molding machine to a pouring machine through the inspection device, the molding machine being configured to produce the mold, the pouring machine being configured to pour a molten metal into the mold; and
a line controller configured to control the casting system, wherein
the inspection device inspects the mold being transported by the transport device as the target, and outputs an inspection result to the line controller.

17. The casting system according to claim 16, wherein the line controller controls the pouring machine so as not to perform pouring to the mold showing that the inspection result is abnormal.

18. The casting system according to claim 16, further comprising
a display device configured to display the inspection result.

19. The casting system according to claim 16, wherein the line controller stores mold information associating the inspection result with a molding condition of the mold,
the line controller analyzes the mold information to acquire the molding condition having a correlation with the mold showing that the inspection result is normal, and
the line controller controls the molding machine so as to perform molding under the acquired molding condition.

20. The casting system according to claim 16, wherein the line controller stores mold information associating the inspection result with a sand property in molding the mold,
the line controller analyzes the mold information to acquire the sand property having a correlation with the mold showing that the inspection result is normal, and
the line controller controls the molding machine so as to perform molding according to the acquired sand property.

* * * * *